Figure 1:
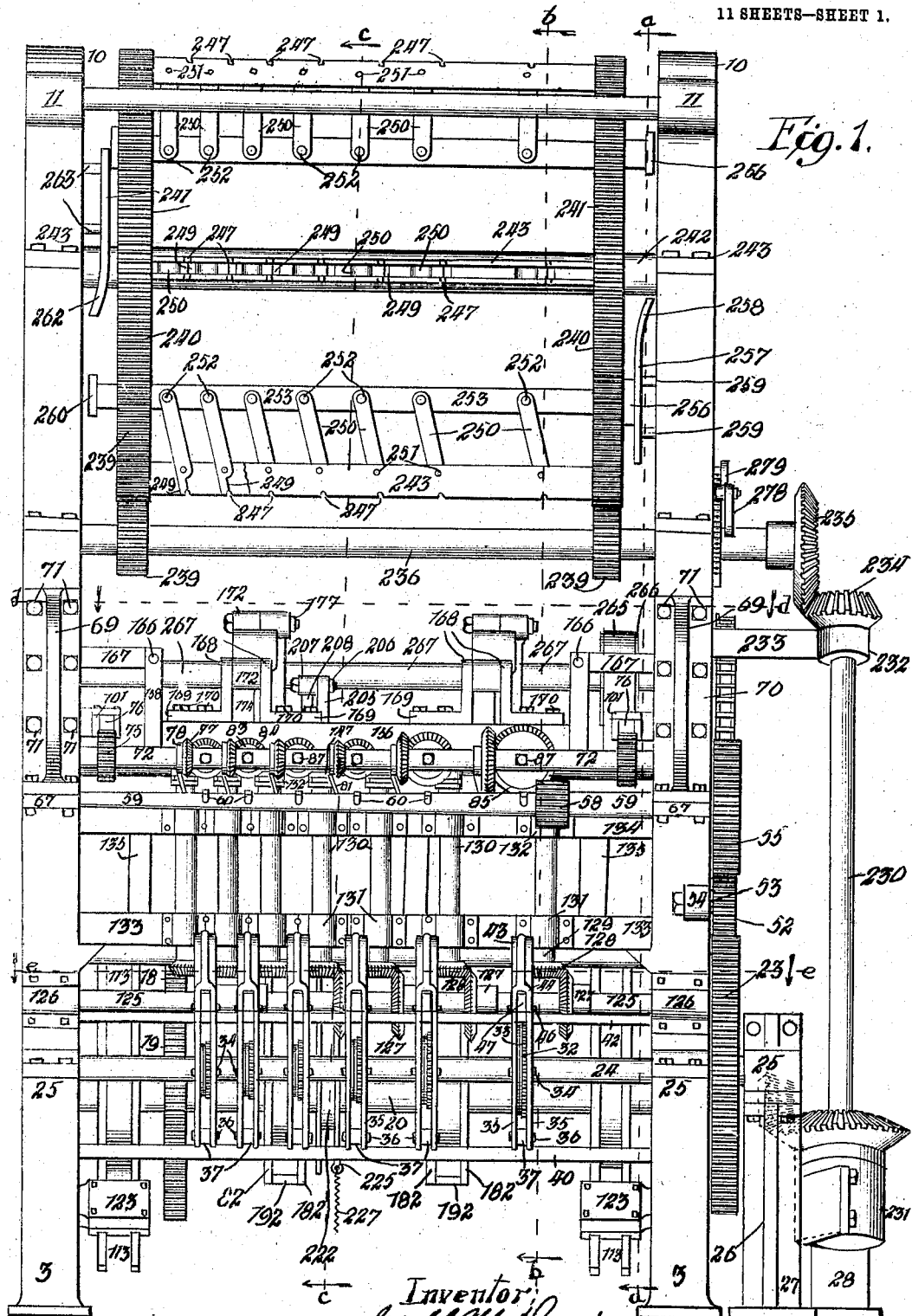

J. M. DENNING.
MACHINE FOR MAKING WIRE FENCE.
APPLICATION FILED SEPT. 25, 1908.

923,778.

Patented June 1, 1909.
11 SHEETS—SHEET 1.

Witnesses:

Inventor:

J. M. DENNING.
MACHINE FOR MAKING WIRE FENCE.
APPLICATION FILED SEPT. 25, 1908.

923,778.

Patented June 1, 1909.
11 SHEETS—SHEET 3.

J. M. DENNING.
MACHINE FOR MAKING WIRE FENCE.
APPLICATION FILED SEPT. 25, 1908.

923,778.

Patented June 1, 1909.
11 SHEETS—SHEET 4.

Witnesses:

Inventor:
Joseph M. Denning
by Banning & Banning
Attys.

J. M. DENNING.
MACHINE FOR MAKING WIRE FENCE.
APPLICATION FILED SEPT. 25, 1908.

923,778.

Patented June 1, 1909.
11 SHEETS—SHEET 6.

Witnesses:
Inventor:

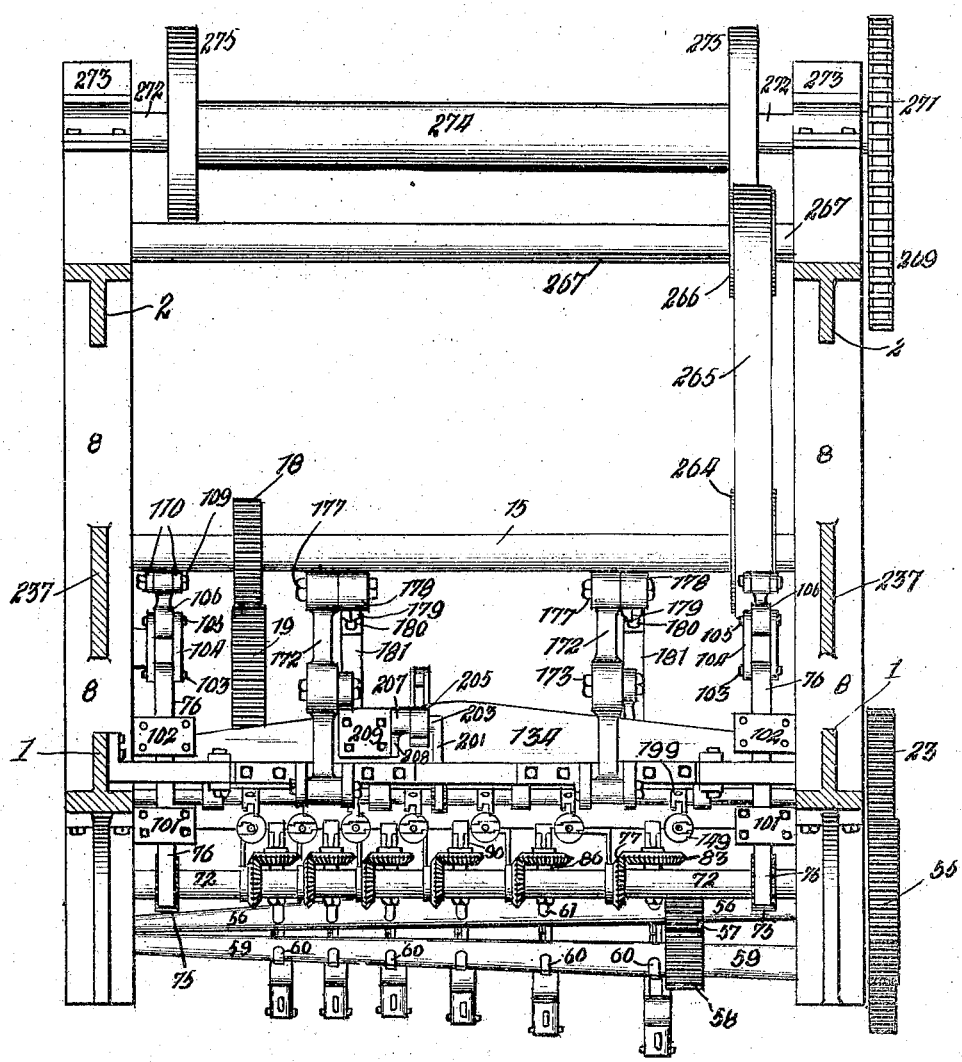

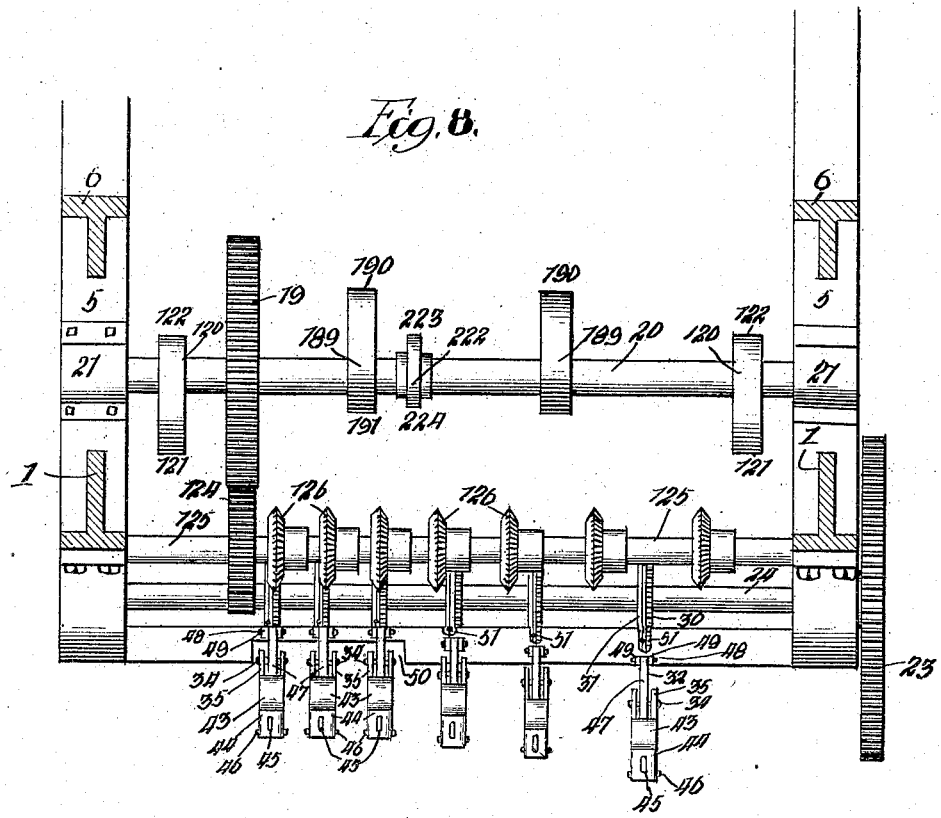
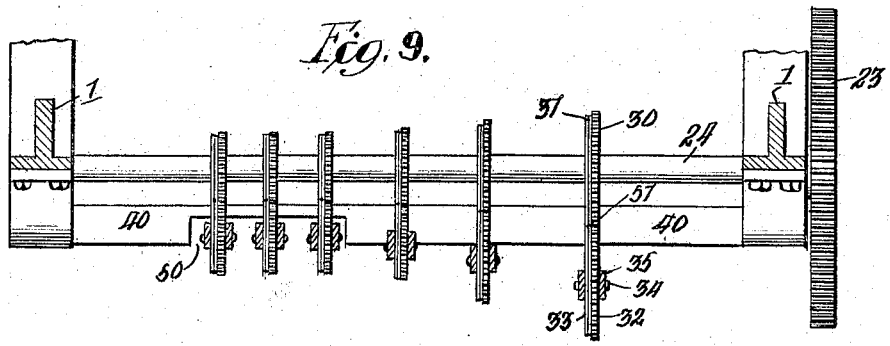

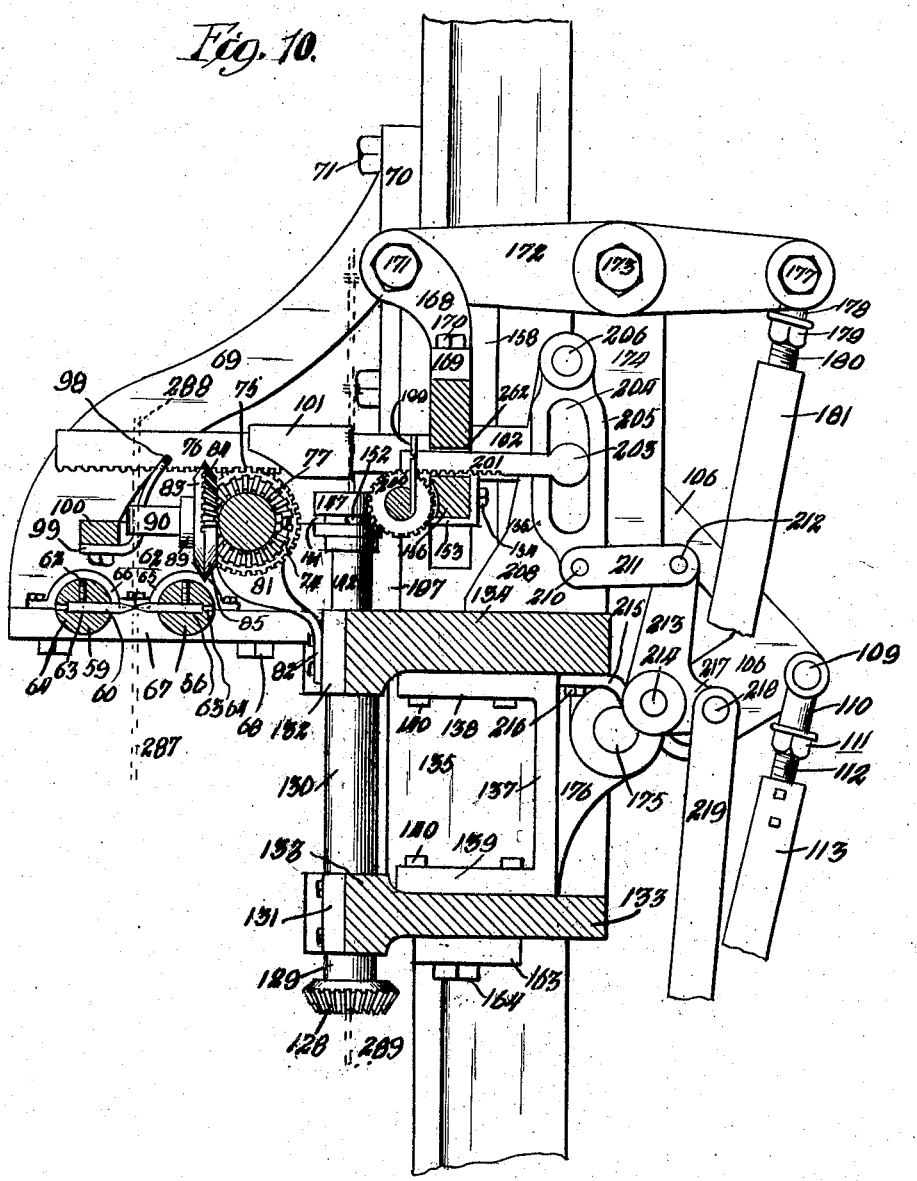

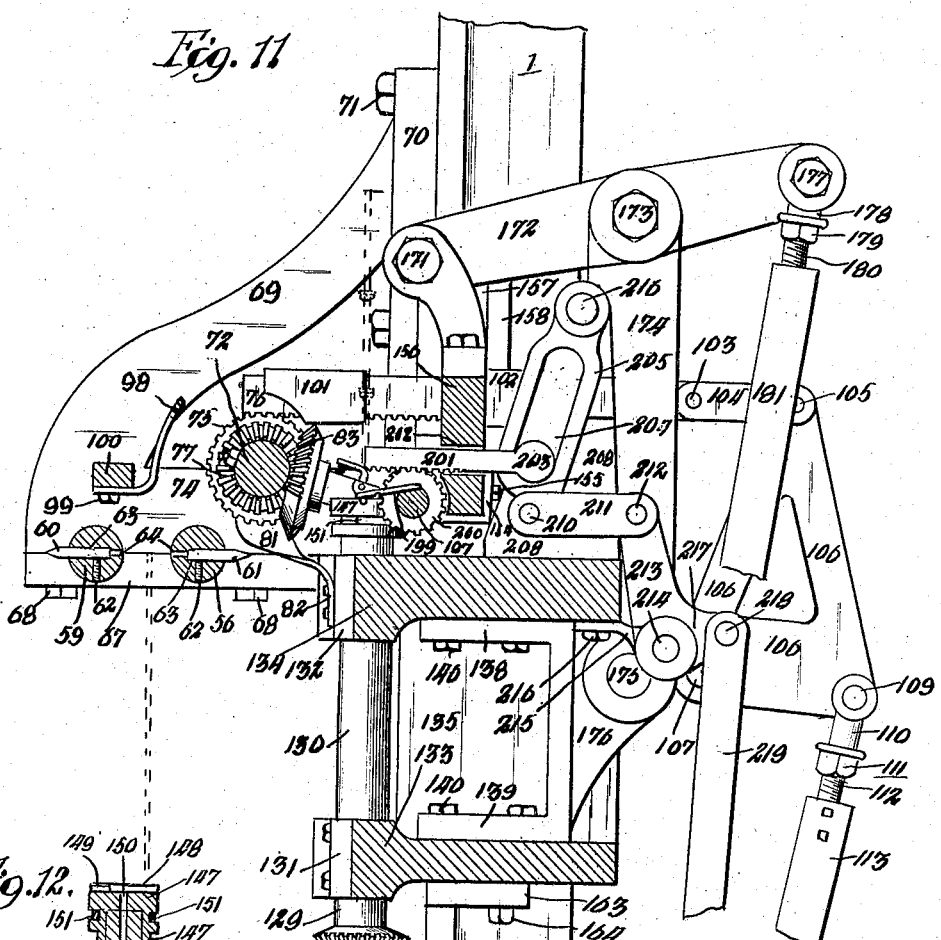

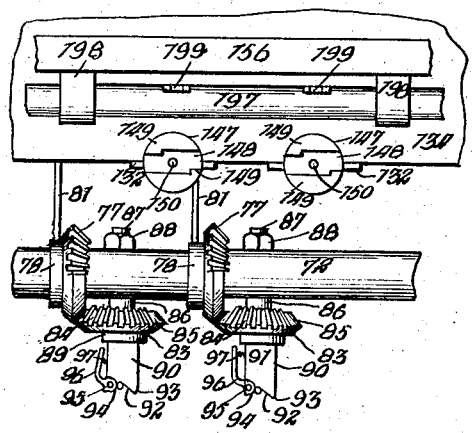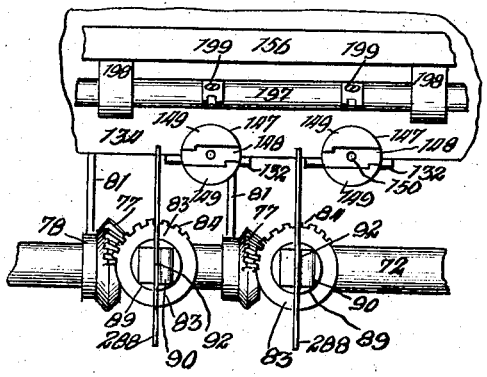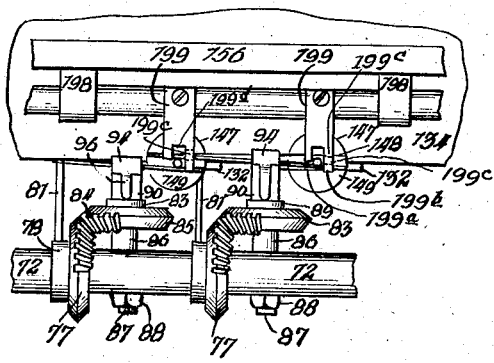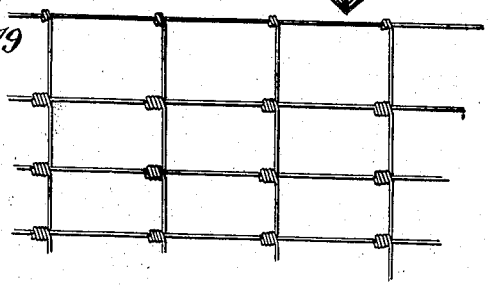

UNITED STATES PATENT OFFICE.

JOSEPH M. DENNING, OF CEDAR RAPIDS, IOWA.

MACHINE FOR MAKING WIRE FENCE.

No. 923,778. Specification of Letters Patent. Patented June 1, 1909.

Application filed September 25, 1908. Serial No. 454,769.

*To all whom it may concern:*

Be it known that I, JOSEPH M. DENNING, a citizen of the United States, residing at Cedar Rapids, in the county of Linn and State of Iowa, have invented certain new and useful Improvements in Machines for Making Wire Fence, of which the following is a specification.

This invention relates to machines for making that type or style of square mesh fencing in which the cross or stay wires each consist of a plurality of sections, the sections spanning the spaces between the strand wires and having their ends overlapping the intermediate strand wires and coiled around such wires, with the end of the outer stay sections coiled around the border strand wires.

The object of my invention is to build a machine for making fencing that will carry on the several operations while the respective mechanisms are continuously running instead of alternately stopping and starting as is the case with most wire fence machines as now constructed and operated. To this end I propose in this machine to provide means for feeding forward the longitudinal or strand wires with a continuous and uninterrupted movement; means for feeding in the transverse or stay wires continuously and uninterruptedly; cutters mounted on shafts which are constantly rotating for severing the desired lengths of stay wire sections as the cutters pass each other in their revolutions and without arresting the advance of the wires from which the stay sections are cut, stay section carriers that grasp or clamp the stay wires and carry the severed sections bodily through the air, and without the aid of guideways or passages, from the place where they are fed in and cut off, to the coilers where they are deposited upon the coiler heads in position for the coiling operation, and coilers that are constantly rotating in one direction and traveling longitudinally with the strand wires during the coiling operation.

The manner in which I provide means for accomplishing the several results above outlined will appear from the following detailed description of the machine itself, which embodies one practical method for carrying out my plan of constructing and operating the machine.

Figure 2:
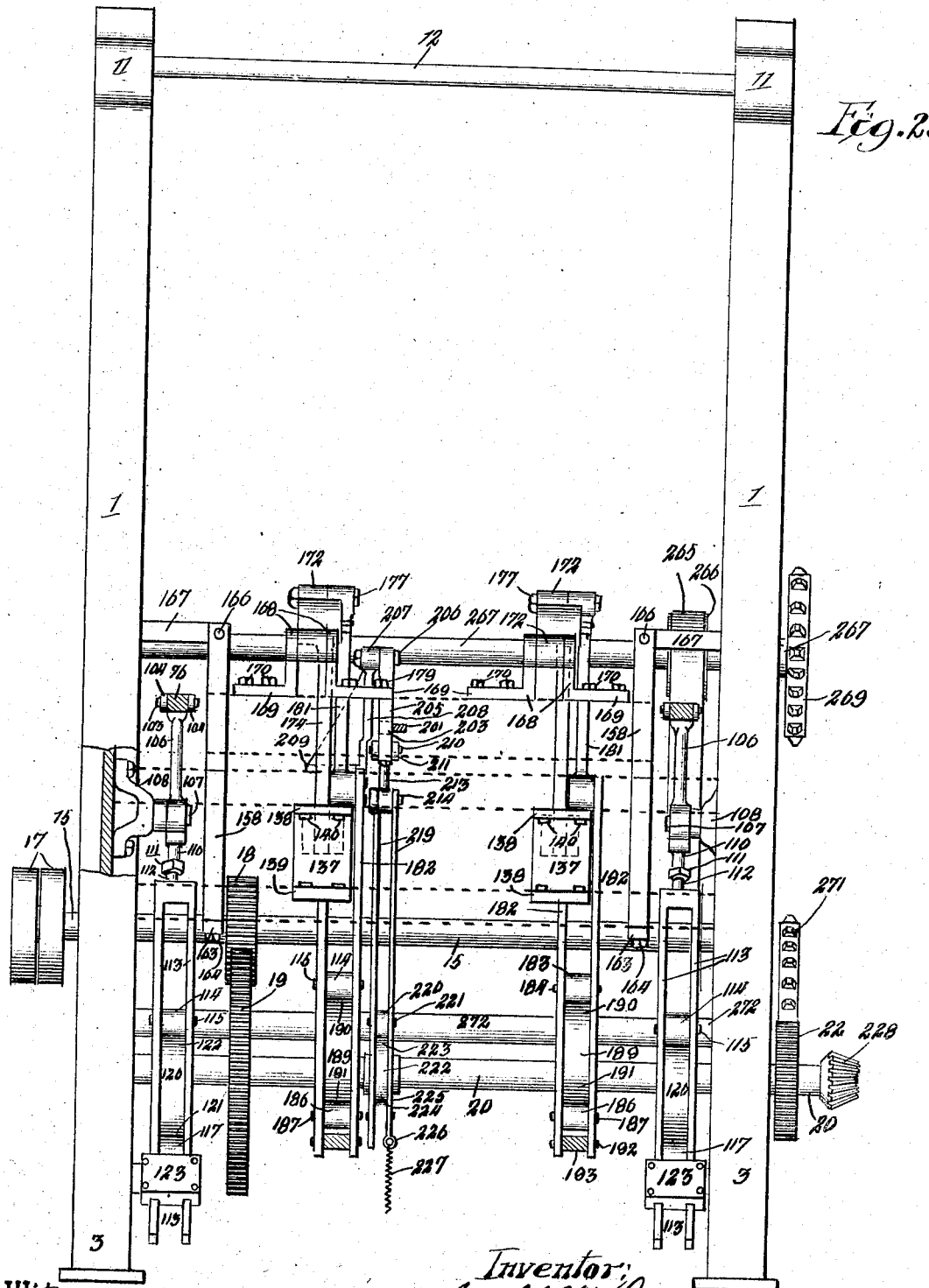
Figure 3:
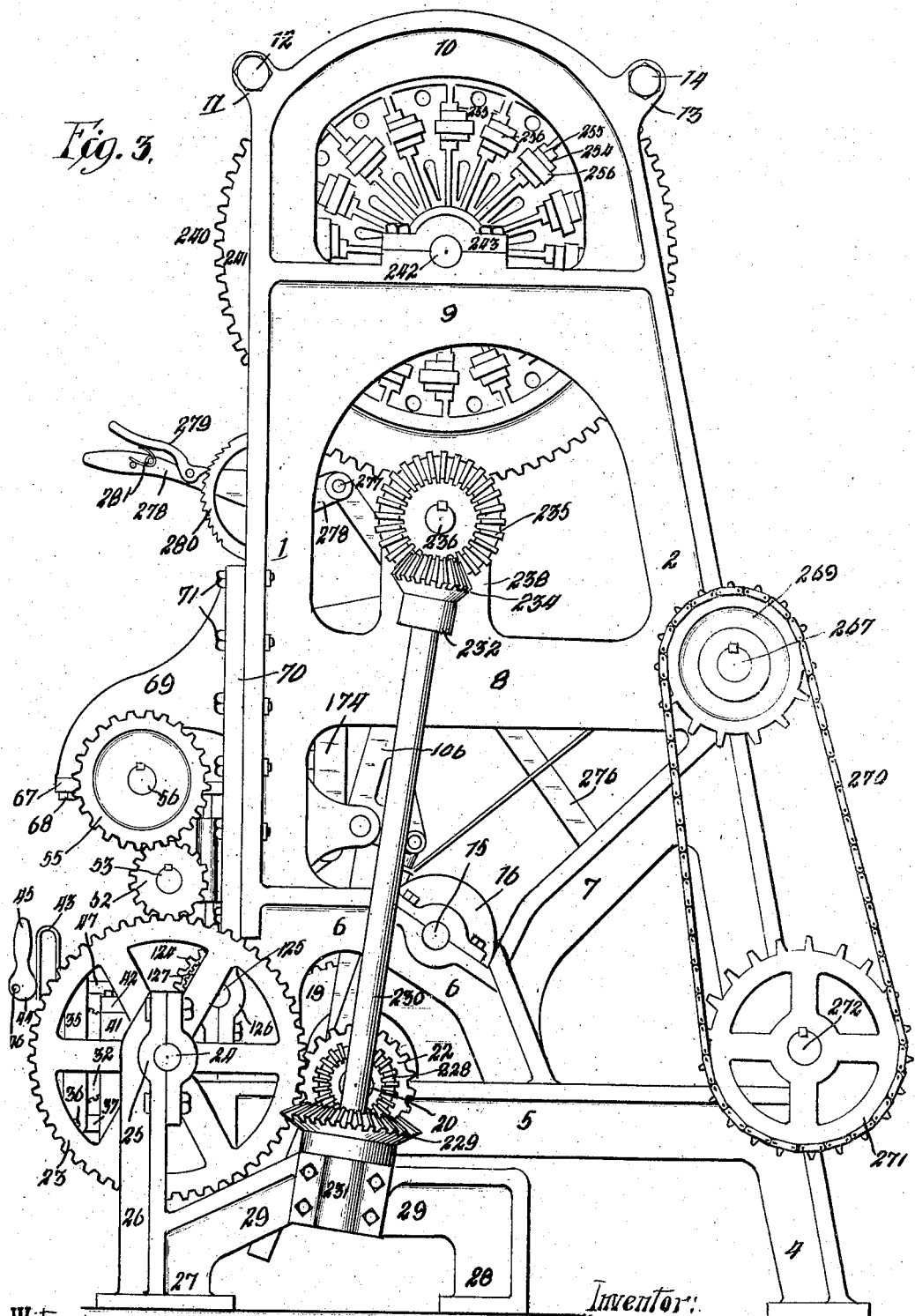
Figure 4:
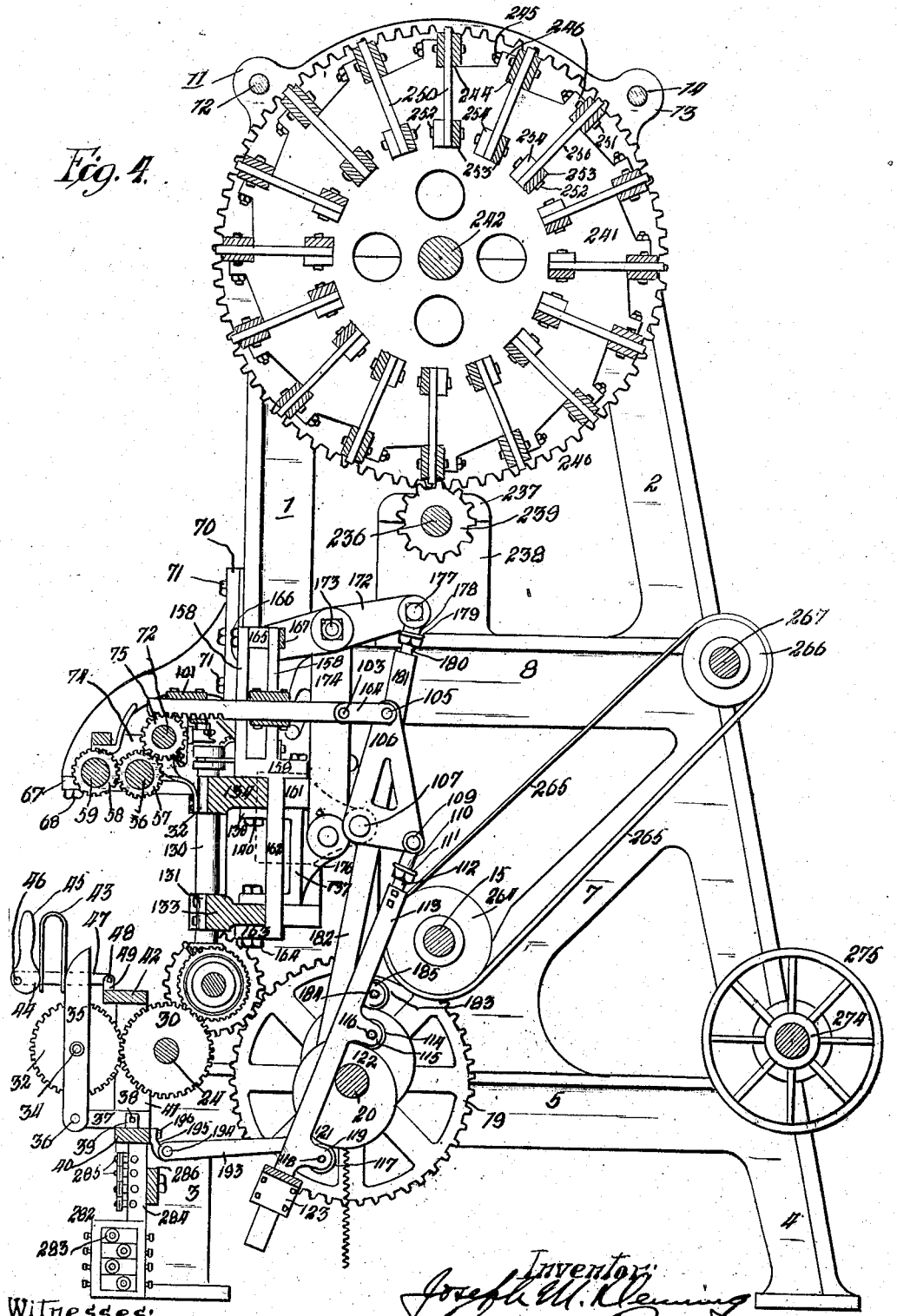
Figure 5:
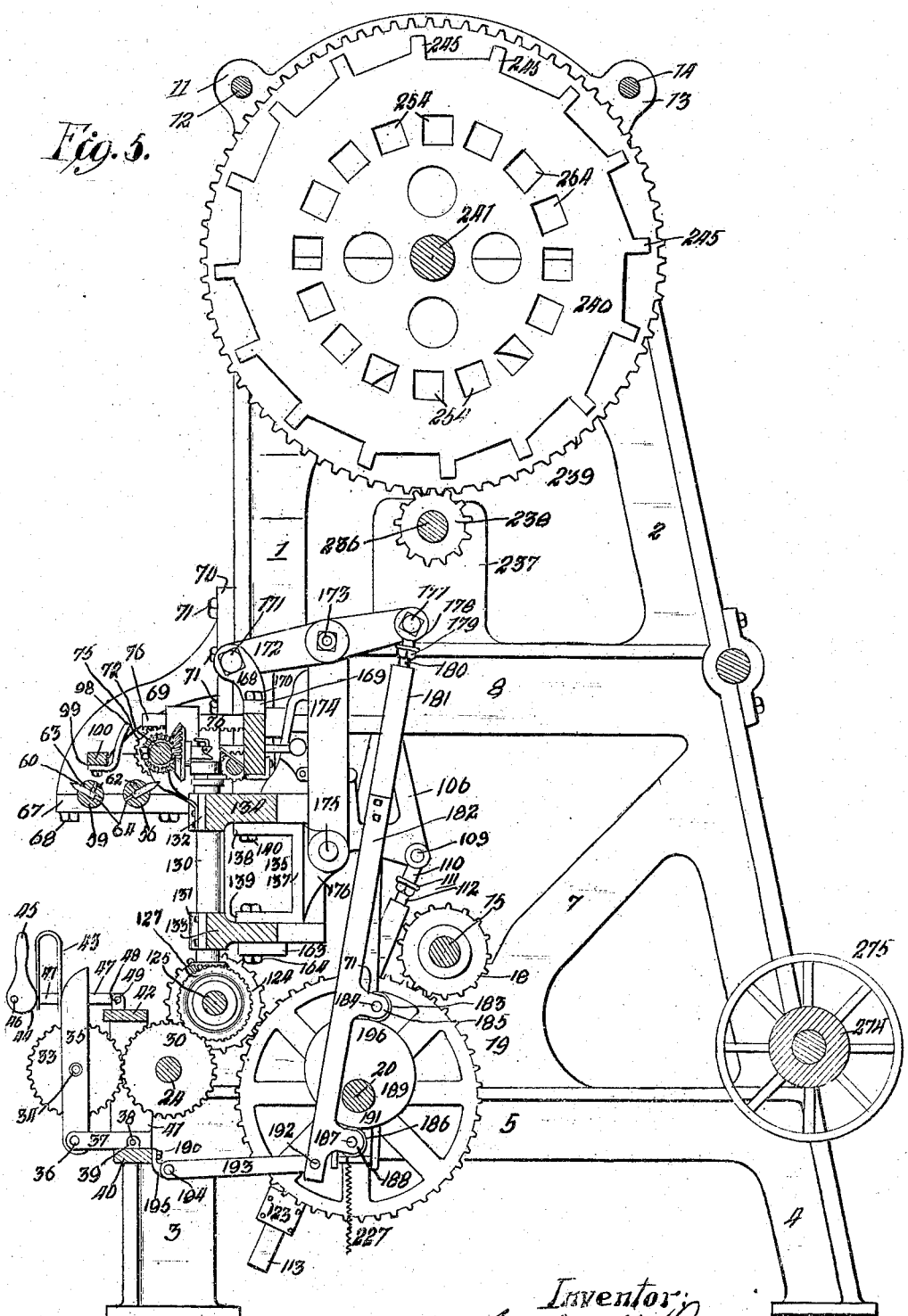
Figure 6:
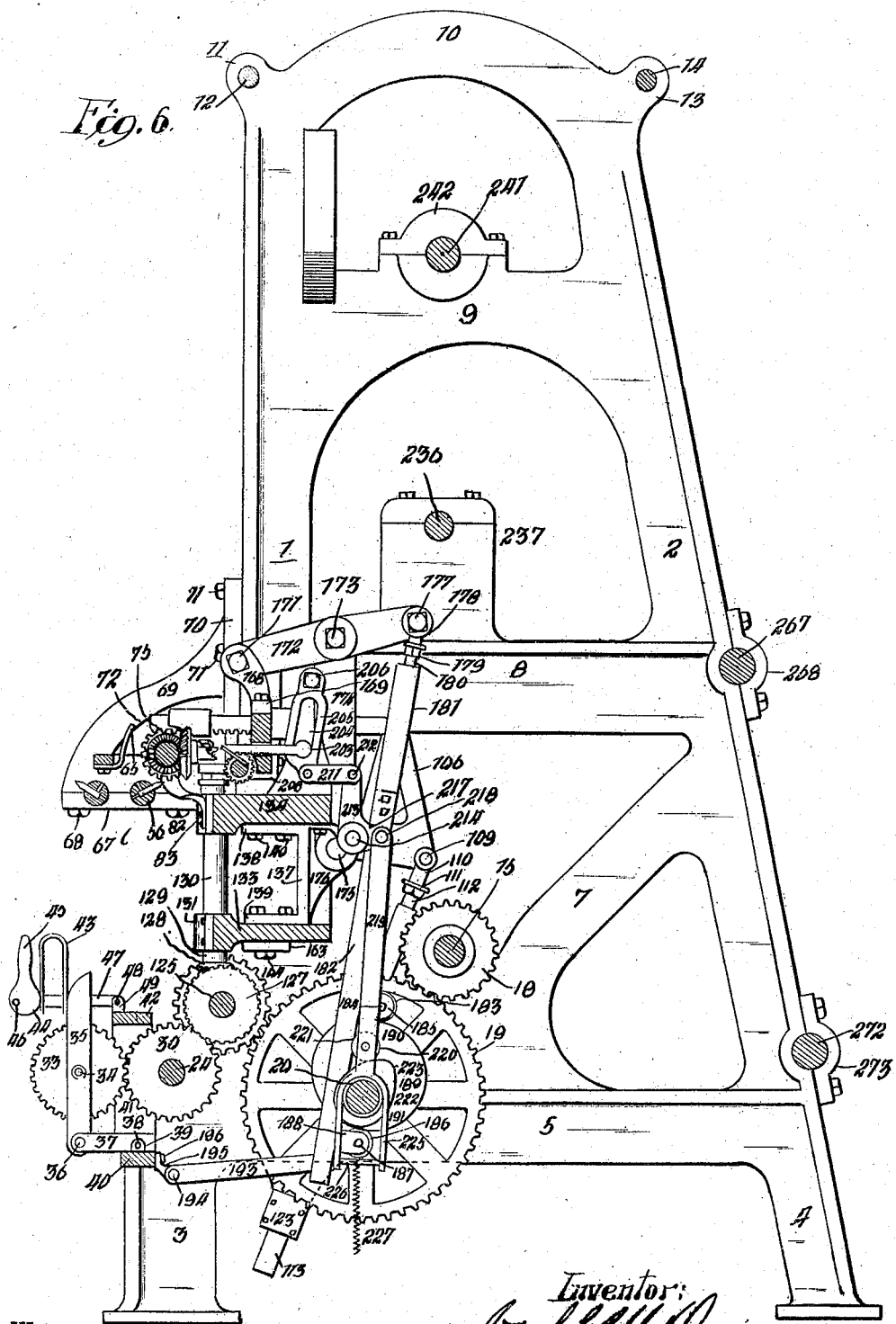

In the drawings, illustrating the machine of the present invention, Figure 1 is a front elevation of the entire machine; Fig. 2 is a front sectional elevation, showing the cams and connections for operating the stay section carrier, the coilers in their reciprocating movement, and the fingers for removing the stay sections; Fig. 3 a side elevation of the entire machine; Fig. 4 a sectional side elevation on line *a—a* of Fig. 1, looking in the direction of the arrow; Fig. 5 a sectional side elevation on the line *b—b* of Fig. 1, looking in the direction of the arrow; Fig. 6 a sectional side elevation on line *c—c* of Fig. 1, looking in the direction of the arrow; Fig. 7 a sectional plan view on line *d—d* of Fig. 1, looking in the direction of the arrow; Fig. 8 a sectional plan view of the parts shown on the line *e—e* of Fig. 1, looking in the direction of the arrow; Fig. 9 a plan view of the feed wheels or rolls for the stay wires; Fig. 10 a detail on an enlarged scale, being a sectional side elevation of the stay carrier mechanism, the coilers, and means for giving an endwise reciprocating movement to the coilers, the fingers for removing the stay sections, and the operating means therefor, showing the stay carrier in its receiving position, the coiler elevated and the removing finger raised; Fig. 11 a similar view to Fig. 10, showing the stay section carrier in its delivering position, the coiler in its lowermost position, and the removing finger for the stay section depressed; Fig. 12 a sectional elevation of a coiler; Fig. 13 a detail on an enlarged scale, showing two of the coilers and two of the clamps of the stay section carrier, with the clamps in their normal or receiving position; Fig. 14 a similar view to Fig. 13, showing the clamps partly turned in the act of delivering the stay sections; Fig. 15 a similar view to Fig. 13, showing the clamps for the stay sections fully turned with the stay sections overlying the coilers and the removing fingers depressed, Figs. 13 and 14 showing the removing fingers elevated; Fig. 16 a detail partly in section, showing one of the fixed gears of the stay-carrier mechanism; Fig. 17 a detail, partly in section, showing an oscillating gear and clamp for the stay carrier mechanism; Fig. 18 a face view on an enlarged scale of an oscillating gear for the stay carrier mechanism and Fig. 19 is a side elevation of a small section of fencing which the machine is adapted to manufacture.

The machine, as shown, has two side frames, each of a corresponding construction, each side frame consisting of a front standard or upright 1, a rear standard or upright 2, vertically inclined, a front leg 3, a rear leg 4, adapted for supporting the machine on a floor or other base, a cross piece 5, a brace 6, running from the cross piece 5 to the standard or upright 1, a brace 7 running from the brace 6 to the standard or upright 2, a cross piece 8 connecting the front and rear standards or uprights, a cross piece 9, and a top piece or arch 10, each cross piece or arch 10 having, on the front side, ears 11, for a tie rod 12, and having, at the rear side, ears 13, for a tie rod 14, which tie rods bind together the two side frames at the upper end. The form of the frame can be varied from the construction shown, so long as the frame is one that will furnish the necessary support for the various mechanisms of the machine.

A main driving shaft 15 is mounted in suitable journal boxes or bearings 16 on the brace 6 in the arrangement shown, and this driving shaft 15, at one end, has pulleys 17, one of which may be fast and the other loose, as usual in the construction of fast and loose pulleys for a driving shaft. The driving shaft 15 has fixedly mounted thereon a gear wheel or pinion 18, which meshes with and drives a gear wheel 19 fixedly mounted on a shaft 20, so as to continuously revolve the shaft 20 when the shaft 15 is revolving. The shaft 20 is mounted in suitable boxes or bearings 21 on the cross piece 5, in the arrangement shown; and this shaft 20, at one end, has a gear wheel or pinion 22 fixedly mounted thereon, which wheel or pinion 22 is in mesh with and revolves a gear wheel 23 fixedly mounted on a shaft 24, which shaft is mounted in suitable journal boxes or bearings 25 on the forward end of the cross piece 5 and on a standard or post 26 adjacent to one of the side frames of the machine, as shown in Figs. 1 and 3. The standard or post 26 has a leg 27, which is connected with a leg 28 by a cross piece 29, as shown in Fig. 3, so that a secondary frame is provided for supporting some of the parts of the machine, as hereinafter pointed out. The shaft 24 is given a continuous rotation when the main driving shaft 15 is revolving; and this shaft 24 has mounted thereon a plurality of gear wheels 30, which gear wheels gradually decrease in diameter, as shown in Fig. 9; and each gear wheel 30 has secured thereto, or formed therewith, a feed wheel or roller 31, which wheels or rollers likewise gradually decrease in diameter, as shown in Fig. 9. Each gear wheel 30, meshes with and drives a gear wheel 32, and the gear wheels 32 gradually decrease in diameter corresponding to the decrease in diameter of the gear wheels 30, as shown in Fig. 9. Each gear wheel 32 has secured thereto, or formed therewith, a feed wheel or roller 33, and the feed wheels or rollers 33 decrease in diameter corresponding to the decrease in diameter of the feed wheels or rollers 31, as shown in Fig. 9. This arrangement of feed wheels or rollers of gradually decreasing diameter subserves a useful and important purpose in the operation of giving a continuous feed to the stay wires, as it enables each stay wire to be simultaneously advanced, and the amount of advance will correspond to the lengths of stay sections required to span the spaces between the longitudinal or strand wires, which usually vary in their distances apart; and it will be understood that the feed wheels or rollers of the greatest diameter feed the stay wire so as to furnish a length of stay section for the widest space between two longitudinal or strand wires; and the feed wheels or rollers of the least diameter feed the stay wire so as to furnish a stay section of a length to span the shortest space between two longitudinal or strand wires,—the intermediate feed wheels or rollers between the ones of the greatest and least diameter feed the stay wires so as to furnish a length of stay section to span the spaces between adjoining longitudinal or strand wires.

Each combined gear 32 and feed wheel or roller 33, is mounted on a journal pin 34, and each journal pin 34 is mounted in suitable bearings therefor in a frame 35, consisting of two side pieces, with a space between the side pieces in which is located the gear and feed wheel or roller. Each frame 35, at its lower end, is mounted on a pin or pivot 36 at the end of a bar 37, and each bar 37 is secured by a bolt 38, or otherwise, between ears or lugs 39 extending up from a bottom piece or bar 40 of a supporting frame, which frame, at each end, has uprights 41, and has a top bar or piece 42, as shown in Fig. 4, for instance. A U shaped spring 43 is located between each frame 35 and a cam 44 having a handle 45, and mounted on a pin or pivot 46, at the end of a bar 47, which passes rearward through the space between the side pieces of the frame 35, and is attached by a bolt 48, or otherwise, to ears 49 extending up from the top piece or bar 42, as shown in Fig. 4, for instance. The several frames 35 are arranged on a diagonal line, corresponding to the decrease in diameter of the series of gears and feed rolls or wheels, and the supporting bars for the several frames correspondingly decrease in length, as shown in Fig. 8. The top and bottom bars or pieces 40 and 42 of the main supporting frame for the stay wire feed rolls or wheels are cut away so as to furnish an open space 50 for locating the gears and feed rolls or wheels of the smallest diameter in proper relation, and, as shown, the top and bottom bars or pieces 40 and 42 of the main frame have slots 51 for a portion of their length, through which slots the stay wires acted on by the feed rolls or wheels of the largest diameter, pass; and the stay wires for the feed rolls or wheels of the least diameter pass inside of the frame, as shown in Fig. 8.

An idler gear wheel or pinion 52 meshes with the gear wheel 23 and is revolved therefrom; and this gear wheel or pinion 52 is mounted on a stub shaft or journal 53 fixedly held in a box or bearing 54 attached to the front standard or upright 1 of one of the side frames, as shown in Fig. 1. The idler gear or pinion 53 meshes with a gear wheel 55 fixedly attached to one end of a shaft 56, on which shaft is a pinion 57 which meshes with a pinion 58 on a counter-shaft 59, see Fig. 4. The countershaft 59 carries a series of knives or cutters 60, and the shaft 56 carries a series of knives or cutters 61, as shown in Figs. 10 and 11, for instance. The knives or cutters 60 and 61 have a continuous rotation, when the machine is operated, and each series of knives or cutters consists of a number corresponding to the number of stay wires, for the knives or cutters to act and sever the advance or leading end of each stay wire into a stay section. Each cutter 60 and 61 is secured in its shaft by a set-screw 62; and each cutter 60 and 61 is entered into a slot 63 formed in the shaft, each slot having an opening 64 leading to the exterior of the shaft for the inserting of a suitable instrument to drive out or remove a cutter in case of breakage or becoming dull, to do which it is only necessary to loosen the set-screw 62 of the knife or cutter, remove the knife or cutter by a suitable punch or other device entered into the opening 64; and, if broken, replace by a new knife or cutter, which is to be secured by advancing the set-screw 62; and if dull, sharpening the knife or cutter and reëntering it into the socket 63 and advancing the set-screw 62 to hold the knife or cutter in place.

The shafts 56 and 59 are set inclined to each other and are also formed tapering, as shown in Fig. 7; and the knives or cutters 60 and 61 decrease in length from one end to the other corresponding to the decrease in diameter of the feed rolls or wheels, so that each pair of knives or cutters for the respective stay wires will operate to sever the advance or leading end into a stay section, when the cutters pass each other in their continuous revolution, as shown in Fig. 10, and after severing the stay section the pair of cutters will separate, as shown in Fig. 11, leaving a clear space between the shafts for the further advance of the stay wires. The shafts 56 and 59 are mounted in suitable journal boxes or bearings 65 and 66, as shown in Fig. 10; and the journal boxes or bearings are located on a plate 67, attached by bolts 68 to the lower or bottom edge of a bracket arm 69, as shown, for instance, in Figs. 10 and 11. The plate 68 and bracket arm 69 are attached by a plate 70 and suitable bolts 71, or otherwise, to the front face of each upright or standard 1 of the side frames, so as to furnish a rigid support for the cutter shafts and cutters and for the carrier of the stay sections.

The carrier, for the stay sections after being severed, is constructed as follows: A shaft 72 is mounted in suitable journal boxes or bearings 73, shown by dotted lines in Fig. 1, and attached to the cross piece 74 of the bracket arm, to which cross piece the plate 67 is attached. The shaft 72, at each end, has a pinion 75, and each pinion is engaged by a reciprocating rack 76, so as to give the shaft 72 a rocking movement, making it, in effect, a rock shaft. A plurality of bevel pinions or gears is entered on the rock shaft 72, and each pinion or gear 77 has a hub 78, with a depending ear or arm 79 which is attached by a pin 80 to a plate or arm 81, having a downturned end 82 by means of which and suitable bolts the plate or arm 81 is fixedly attached and holds its pinion or gear 77 in a fixed relation on the shaft 72, with the shaft free to rock forward and backward through the plurality of gears or pinions.

Each fixed gear 77 has a companion gear 83, and each gear 83, as shown, is a mutilated gear having an acting section 84 and a smooth section 85, see Fig. 18. Each mutilated gear 83, is mounted on a journal pin 86, and each journal pin 86 has a stem 87, which passes through the shaft 72, and is fixedly held in the shaft by a nut 88, so that each gear 83 has a swinging movement corresponding to the rocking movement of the shaft 72, and in addition has a forward and backward rotation through the engagement of the acting section 84 with the fixed gear 77, as the gear 83 is rocked forward and returned by the movement of the rock shaft 72 in turning forward and backward. Each gear 83, instead of being a mutilated gear could be a gear with a continuous acting face, but by using a mutilated gear having an acting section 84 and a smooth section 85 increased certainty is obtained in the throw or swing of the gear. Each oscillating gear 83 has a flange or head 89, extending out from which is a stem 90, of a rectangular shape in cross section, as shown; and the stem 90 has, in its end, on one side, a recess 91, and across its face a groove or recess 92 located between a fixed jaw 93, on the stem 90, and a movable jaw 94, pivotally mounted in the recess 91 by a pin or pivot 95, so that the fixed jaw 93 and the movable jaw 94 constitute a clamp for holding a stay wire section in the groove or notch 92 to be delivered over the coiler head. Each movable jaw 94 has an arm or handle 96, which is held in normal position, so as to clamp the movable jaw on the stay wire section, by means of a coiled spring 97, located between the handle 96 and the body of the stem 90, as shown in Fig. 13, in which one of the movable jaws is shown open and the other movable jaw is shown closed.

The movable jaw is thrown open to receive a stay wire section into the cross groove or notch 92 by the engagement of the handle or arm 96 with a curved plate or bar 98, a plate or bar 98 being provided for each handle or arm; and the plate or bar 98 is attached by a lag bolt 99, or otherwise, to a cross bar 100, extending between the bracket arms 69 and attached in any suitable manner to the bracket arms. The return of each swinging gear 83 to normal position, as shown in Fig. 10, causes the handle 96, of each movable jaw 94, to engage the edge of the curved plate 98, which edge has a cam formation, so that as the stem 90 descends to its normal position, shown in Fig. 10, the handle 96 will be moved toward the stem 90, opening the movable jaw 94, as shown, for the left hand gear 83, on Fig. 13; and when the movable jaw is in its open position, the leading or forward end of a stay wire is free to pass upward therethrough, such upward movement continuing with the forward throw of the swinging gear 83 and the stem 90, and with the severance of the stay section from the body of the stay wire, the stem 90 has passed the cam edge of the plate 98, and the spring 97 acts to force the handle 96 outward, closing the movable jaw 94 and clamping and holding the severed or cut stay section, so that such stay section will be carried upward and downward into position over the coiler heads. The travel of each swinging gear 83 around the fixed gear 77, caused by the rocking movement of the shaft 72, gives the gear 83 a rotation around its axis, which turns the stem 90, so that the caught stay section will be carried upward to the limit of the vertical center of the fixed gear 84, and will be carried downward, with the continued rearward movement of the rock shaft 72, from the vertical center of the gear 77, giving the stem 90 and the clamping jaws a half revolution by which the stay section, which is received vertically between the clamping jaws, will be turned and brought into a horizontal position so as to overlie the ends of the coiler heads. As shown, each alternate stem 90, with its clamping jaws 93 and 94, is longer than the intermediate stem 90 and its clamping jaws, by which arrangement the stay sections will be placed alternately in position on opposite sides of the strand wires, so that the overlapping ends of adjoining stay sections will be on opposite sides of a strand wire, as shown in Fig. 15, to be caught and wound around the strand wire. It is to be understood that the stems carrying the clamping jaws 93 and 94 could be of the same length, in which case the stay sections would be positioned on the same side of the strand wires, with the overlapping ends for adjoining stay sections on the same side of a strand wire to be caught and wound around the strand wire.

The shaft 72, in the construction shown, is given a backward and forward rock by means of the pinions 75 and the racks 76, a pinion and rack being located near each end of the shaft 72 within the side frame, as shown in Fig. 7, for instance. Each rack bar 76 is mounted and supported, and is free to slide back and forth in a front guide 101 and a rear guide 102, attached to the side frames of the machine in any suitable manner. Each rack bar, at its rear end, is connected by a pin or pivot 103, with links 104, and the links 104 are connected by a pin or pivot 105 with the upper end of a triangular shaped lever 106, which lever, at its front lower corner, is mounted on a pin or pivot 107, extending out from a bracket plate 108 attached to the side frame of the machine, as shown in Fig. 2.

The rear lower corner of the triangular shaped lever 106 is connected by a pin or pivot 109 with one member 110 of a coupling, which member 110 is connected by a nut 111 with a threaded stem 112 constituting the other member of the coupling. The stem or member 112 of the coupling is fixedly attached to a bar 113, formed of two plates spaced apart, as shown in Fig. 2, for instance. The bar or pitman 113 has a roller 114 mounted on a pin or pivot 115 secured between ears 116, one ear projecting from each side plate of the actuating bar or pitman; and the actuating bar or pitman 113 has a lower roller 117 mounted on a pin or pivot 118 located between ears 119, one ear projecting from each side plate of the bar or pitman. The upper roller 114 and the lower roller 117 are located on opposite sides of a cam 120, having a projecting side 121 and a narrow side 122, which cam 120 is fixedly mounted on and revolves with the shaft 20, so that, as each cam 120 is revolved with the revolving of the shaft 20, the projected side 121 will engage the upper roller 114 and carry or move the bar or pitman 113 upward, swinging the triangular shaped lever 106 on its pin or pivot 107, moving the upper end of said lever forwardly, giving a forward movement to each rack bar 76, for the rack bars to turn the pinions 75 and give the shaft 72 a semi-rotation or rock in a forward direction, returning the swinging gears 83 and the clamping jaws carried by said gears back to the normal or receiving position for the jaws. The continued rotation of the shaft 20 carries with it the cam 120 for the projected face 121 of said cam to engage the lower roller 117 and force or carry downward the bar or pitman 113, swinging the triangular shaped lever 106 on its pin or pivot 107 and moving the upper end of said lever rearwardly, giving each rack bar 76 a rearward movement by which the pinions 75 will be partially rotated or turned so as to give the shaft 72 a partial rotation or rock in a rearward direction, carrying with it the gears 83 and the clamping jaws connected with the gears, for the clamping jaws to be closed, as hereinbefore described, holding a stay wire section so that such section will be turned from a vertical position into a horizontal position and overlie the acting faces of the coiler heads. The coupling, formed by the members 110 and 112 and adjusting nut 111, enables the bar or pitman 113 to be made of the required length to give the desired throw to the triangular shaped lever 106, to reciprocate the racks 76 with the required length of throw for each rack to swing the gears 83 and the clamping jaws carried by the gears from their forward position to their rearward position, and from their rearward position to their forward position, so that the jaws will receive and deliver a stay section with each rearward throw and will be returned to normal position to receive another stay section with each forward throw of the rack bars. It will be seen that the movements of each stay section clamp will be in unison, one with the other, so that all of the stay sections, after being severed, are caught by the clamps, carried upward and downward, and delivered simultaneously in position over the coiler heads. Each bar or pitman 113 is given a straight line throw by a guide 123, through which the lower end of the bar or pitman extends, as shown in Figs. 1, 2 and 4, for instance.

A gear wheel or pinion 124 meshes with the gear wheel 19, and the wheel or pinion 124 is fixedly attached to a shaft 125 mounted in suitable journal boxes or bearings 126 on the front face of the front standards 1 in the arrangement shown, see Fig. 3. The shaft 125 has fixedly mounted thereon a plurality of bevel gears 127, which gears correspond in number to the number of coilers for the machine. Each gear 127 has meshing therewith a bevel pinion 128, and each pinion 128 has a hub 129 fixedly attached to a hollow shaft or sleeve 130, mounted in a lower journal box or bearing 131 and an upper journal box or bearing 132, as shown in Figs. 10 and 11. The lower journal boxes 131 are on a plate 133, extending between the side frames of the machine; and the upper journal boxes 132 are on a plate 134, extending between the side frames of the machine; and, as shown, the lower plate 133, and an upper plate 134, are connected together by vertical plates 135, so as to form a frame supporting the coilers; and, as shown, the lower plate 133, rests upon lugs or projections 136 inwardly extending from the front standard or upright of each side frame, see Fig. 1. The plates 133 and 134 have located between them two supports arranged at a distance apart, each support consisting of a rear vertical member 137, an upper horizontal member 138, and a lower horizontal member 139, the upper and lower horizontal members being attached by bolts 141, or otherwise, to the upper and lower plates 133 and 134 respectively.

Each hollow coiler shaft or sleeve 130 has entered thereinto a shaft 141 the upper portion of which is of greater diameter than the lower portion, as shown in Fig. 12, forming, at the juncture of the two portions of the shaft, a shoulder terminating in a circumferential groove 142; and the tubular shaft or sleeve 130 has, on its inner face, vertical grooves 143 located opposite each other, forming, for each groove, a lower shoulder 144 and an upper shoulder 145, which shoulders form stops for balls or rollers 146 lying within the circumferential groove 142, so that the inner shaft 141 is locked to the outer shaft or sleeve 130 to revolve therewith, and at the same time has a reciprocating endwise movement to the limit of the grooves 143, by which construction each coiler, as a whole, has a continuous rotation and a limited endwise reciprocating movement.

Each coiler shaft 141 has fixedly attached to its upper end a coiler head 147, and each coiler head has, in its acting face, a cross groove or recess 148, forming, on each side, lips 149, for engaging the ends of the stay sections and coiling such ends around the adjacent strand wire. Each coiler head 147 has an axial hole 150, which hole extends through the coiler shaft 141 and through the wall of the pinion 128, as shown in Fig. 12, so as to furnish a passage for the longitudinal or strand wires axially through the coiler as a whole.

Each coiler head has a circumferential groove 151, into which is entered a fork 152 on an arm or plate 153; and each arm or plate 153 has an upturned end 154, which is attached by a bolt 155, or otherwise, to the rear face of a cross head 156, so that, as the cross head is moved up and down the coiler head 147 and the coiler shaft 141 will be given their endwise reciprocating movement. Each end of the cross head 156 is entered into a slot or passage 157 between guide bars 158; and the guide bars 158 extend upwardly from a cross plate 159, attached by a bolt 160, or otherwise, to the upper supporting plate 134, as shown in Fig. 4; each base plate 159 has extending downwardly therefrom a plate 162, with an inturned ear 163, by means of which and a bolt 164, or otherwise, the bar 162 is attached to the lower plate 133, so that the two plates 133 and 134 are tied together by the bar 162, and the guide bars 158 are given a firm support by which the cross head will be held in a straight line movement up and down.

Adjacent to each end of the cross head 156 is an arm or bracket 168, each arm or bracket having an ear 169, by means of which, and a bolt 170, or otherwise, the arms or brackets are attached to the cross head. Each arm or bracket, at its upper end, has a pivot or pin 171, onto which is entered one end of a walking beam or lever 172, mounted upon a pin or pivot 173 at the upper end of a link or swinging standard 174, the lower end of which is entered onto a pin or pivot 175, extending out from an ear or bracket 176 on the member 137 of the support between the plates 133 and 134, as shown in Fig. 6, for instance. The rear end of each lever or walking beam 172 is connected by a pin or pivot with a member 178 of a coupling, which member is connected by an adjusting nut 179, with the other member 180 of the coupling; and the member 180 is connected to the upper end of a section 181 of a rod or pitman; and the rod or pitman has a section 182 formed of two plates, with a space between the plates, as shown in Figs. 1 and 2. An upper roller 183 is mounted on a journal pin or pivot 184, supported in ears 185, an ear extending out from each side plate of the section 182 of the rod or pitman, and a lower roller 186 is mounted on a journal pin or pivot 187 supported in the ears 188, an ear extending out from each side plate of the sections 182 of the rod or pitman, as shown in Fig. 5. A cam 189 is located between the upper roller 183 and the lower roller 186, and this cam 189 has a projected face 190 and a narrow face 191, and is mounted on and revolves with the shaft 20, so that the revolving of the cam 189 will cause the projected face 190, as it engages the roller 183, to elevate or move upwardly the pitman or rod 181 and 182, raising the rear end of the lever or walking beam 172, and depressing the forward end of such lever or pitman, carrying down the cross head 156 and forcing the coiler heads and coiler shafts into the lowermost or normal position for receiving the stay sections. The continued revolution of the cam 189 causes the projected face 190 to engage the roller 186, and with such engagement the rod or pitman 181 and 182 will be forced downward, carrying downward the rear end of the lever or walking beam 172 and raising the front end of such lever or pitman and with it the cross head, for the upward movement of the cross head to simultaneously raise all of the coiler heads and coiler shafts which continue to revolve, and in revolving wind or coil the ends of the stay sections around the strand wires, during the upward movement of the coiler heads.

It will be seen that the continuous revolution of the cam or eccentric 189 operates the lever or walking beam 172, for such lever or beam to raise and lower the cross head and with it the coiler heads and coiler shafts, thus giving a positive movement in raising and lowering the coiler heads and shafts. The coupling connection between the rod or pitman 181, 182, and the end of the lever or walking beam 172, enables the throw of the rod or pitman to be accurately adjusted so as to give the required oscillation for the lever or walking beam to raise and lower the cross head and the coiler heads and shafts the distance required for the operation of coiling the ends of the stay sections around the strand wires. The connecting rod or pitman for the rollers 183 and 186 is maintained in a straight line throw of movement by means of a pin or pivot 192 at the lower end of the rod or pitman, to which pin or pivot is connected a strap or link 193, the forward end of which is connected to a pin or pivot 194 on an ear 195 attached by a bolt 196, or otherwise, to the bottom piece 40 of the frame for the feed rolls of the stay wire, as shown in Figs. 5 and 6. It will be understood that in the construction shown, a lever or walking beam, a connecting rod or pitman with rollers 183 and 186 and a cam 189 are provided for each arm or bracket 168, but a single walking beam, with the operative parts therefor, could be used if so desired.

A shaft 197 is mounted in suitable bearings 198 on the cross head 156, and moves up and down with the cross head. The shaft 197 carries a plurality of fingers 199, one finger for each longitudinal or strand wire; and on the shaft is a pinion 200 with which a rack 201 meshes, the body of the rack passing through a slot 202 therefor in the cross head. The rear end of the rack has a projecting pin 203, which enters a slot 204 in a link 205, the upper end of which is mounted on a pin or pivot 206, extending out from an eye 207 on a post or upright 208 having a flange 209, see Fig. 7, by means of which and suitable bolts, the standard or upright 208 is attached to the cross bar or plate 134, in the construction shown. The lower end of the swinging link 205 is connected by a pin or pivot 210 with horizontal links 211, which links, at their rear ends, are connected to a pin or pivot 212 on the arm or member 213 of a bell-crank lever, which lever is pivotally mounted on a pin or pivot 214, carried by an ear or bracket 215 attached by a bolt 216, or otherwise, to the under face of the cross plate or bar 134, as shown in Figs. 10 and 11. The other arm or member 217 of the bell-crank lever is attached by a pin or pivot 218 to the upper end of a rod or pitman 219 formed, as shown, of two plates, with a space between the plates. A roller 220 is mounted on a journal pin or pivot 221, between the plates of the rod or pitman 219; and this roller is engaged by a cam 222, having a projected face 223, and a face 224, which cam 222 is fixedly mounted on and revolves with the shaft 20, so as to give a reciprocating movement to the rod or pitman. The engagement of the projected face 223 of the cam 222, with the roller 220, forces upward the rod or pitman 219, swinging the L or bell-crank lever on its pin or pivot for the arm 213, through the links 211, to swing forwardly the link 205, advancing the rack 201, for the engagement of the rack with the pinion 200 to rock the shaft 197 and carry down the fingers 199, for the fingers to act and force the stay sections from the swinging clamps by which the stay sections are delivered over the coiler heads; and the fingers operate to force the ends of the stay sections into the cross groove or recess 148 of each coiler head, for the lips 149 of each coiler head to act and coil or wind the ends of the stay sections around the adjacent strand wire.

The fingers 199 are in their vertical and normal position, when the clamps are in the position shown in Fig. 10; and the fingers 199 are forced forwardly and downwardly as the clamps are swung upwardly and rearwardly to deposit the stay sections; and the fingers 199 reach the lowermost point of descent so as to catch the stay sections just after the stay sections have been delivered by the clamps in position over the coiler head, at which time the coiler heads are in their normal position as shown in Fig. 10. The lower end of the rod or pitman 219 has a fork 225 which straddles the shaft 20, and the open end of the fork 225 has a cross pin 226, to which is attached one end of a coiled spring 227, in the arrangement shown, the other end of which spring is fixedly attached to the floor, or other fixed support. The spring 227 acts to return the rod or pitman 219, after the acting face of the cam 222 has passed the roller 220, and with such return of the rod or pitman 219, the bell-crank lever, through its arm 213 and the links 211, will swing the link 205 rearwardly, carrying with it the rack 201, and, through the engagement of the rack with the pinion 200, rock the shaft 197 rearwardly, raising the fingers 199 to their normal positions, as shown in Fig. 10, and the fingers are shown in their advanced or acting position in Fig. 11. The shaft 197 moves with the cross head 156, and the fingers on the shaft move accordingly, so that the fingers have a vertical rising and falling movement and also a swinging movement through the rock shaft, by which movement the fingers will be positively actuated, so as to engage and remove the stay sections from the clamp, and be moved up out of the way to allow the continuous feed of the completed fence fabric and the longitudinal or strand wires. The slot 204, in the swinging link 205, allows of the necessary lost motion to keep the rack 201 in engagement with the pinion 200, as the cross head is raised and lowered.

The shaft 20, at one end, projects beyond the side frame of the machine, and has fixedly attached thereto, in the arrangement shown, a bevel pinion 228, which meshes with a bevel pinion 229, as shown in Figs. 1, 2 and 3. The bevel wheel or pinion 229 is fixedly attached to the lower end of a shaft 230, which is supported in a lower journal box or bearing 231, on the top or cross piece 29 of the supplemental frame, and an upper bearing or journal box 232 extending out from the side frame of the machine, as shown in Figs. 1 and 3. The upper end of the shaft 230 has fixedly secured thereto a bevel pinion 234, which meshes with a bevel wheel 235 fixedly attached to the end of a shaft 236, which shaft is supported in suitable journal boxes or bearings 237 on standards or uprights 238, extending up from the cross pieces 8 of the side frames. The shaft 236, adjacent to each side frame, has fixedly secured thereto or mounted thereon, a pinion 239, and each pinion meshes with a gear 240 on a head or disk 241, which heads or disks are fixedly mounted on a shaft 242, which shaft is mounted in suitable journal boxes or bearings 243 on the cross piece 9 of each side frame, as shown in Fig. 3.

A plurality of cross bars 244 arranged in pairs, extend from head to head 241; and each pair of cross bars 244 is attached by bolts 245 to lugs 246, formed on the inner face of each head 241, as shown in Fig. 4, the end heads 241 and cross bars 244 constituting a drum. The outer edge of each pair of cross bars 244 has a series of notches 247, each notch adapted to receive a longitudinal or strand wire; and the longitudinal or strand wire is held in its notch 247 by a companion notch 248 in the end 249 of a link or arm 250; and each link or arm 250 passes between a pair of bars 244, being pivotally mounted between the bars by a pin or pivot 251, as shown in Fig. 1. The inner end of each arm or link 250 is attached by a pin or pivot 252 to a sliding bar 253; each bar, 253, at each end, to give additional strength, having a reinforcement 254, attached thereto. Each bar 253, and its reinforcement 254, passes through a slot or opening 255, see Fig. 5; and each bar is of a length to project beyond the end heads 241 of the drum. One end of each sliding bar 252 has a shoe 256, which, as the heads continuously revolve, successively comes in contact with a cam plate 257 having a curved portion 258, and is attached by rods or bolts 259 to the side frame, as shown in Fig. 1. The other end of each sliding bar 253 has attached thereto a shoe 260, which, as the heads 241 continuously revolve, comes in contact with a cam plate 261 having a curved portion 262, and is attached, by rods or plates 263, to the side frame of the machine. It will thus be seen that as each shoe 256 engages the cam plate 257, the sliding bar of such shoe will be moved in the opposite direction, so as to carry the links in the same direction, and force the notched ends 249 toward the notches 247, clamping the longitudinal or strand wires in the notches 247; and that as the shoes 260 successively engage the cam plate 261, the sliding bars will be moved in the opposite direction, carrying the links 250 in the same direction and moving the notched ends 249 away from the notches 247, so as to release the longitudinal or strand wires from the notches 247, as shown by the upper sliding bar in Fig. 1, the lower sliding bar of said figure showing the position of the arms or levers 250 in clamping the longitudinal or strand wires. This drum is located at the top or upper end of the frame and serves as the means for continuously advancing the longitudinal or strand wires and the completed fencing, as the drum has a continuous revolution from the gears 240 and the pinions 239 on the shaft 237, which shaft is continuously driven by the gears 234 and 235 from the shaft 230, which shaft in turn is continuously driven by the gears 228 and 229 with the continuous revolving of the shaft 20, when the shaft 15 is revolved. It will be seen that the longitudinal or strand wires and the stay wires have a continuous feed while the machine is in operation.

The shaft 15 has fixedly mounted thereon a pulley 264 over which a belt 265 runs, which belt drives a pulley 266 on a shaft 267, so as to continuously revolve the shaft. The shaft 267 is mounted in suitable journal boxes or bearings 268 on the rear standards or uprights 2 of each side frame; and this shaft 267, at one end, has a sprocket wheel 269, see Fig. 2, over which a sprocket chain 270 runs, which chain drives a sprocket wheel 271, as shown in Fig. 3. The sprocket wheel 271 is fixedly mounted on a shaft 272, supported in suitable journal boxes or bearings 273 on each rear standard or upright of the side frames. The shaft 273 has thereon a sleeve 274, which sleeve, at each end, has a disk 275 forming the support for a reel, not shown, and onto which the completed fabric is continuously wound. A belt tightener or roller, not shown, is carried by a bar 276 at its lower end; and the upper end of this bar is connected by a pin or pivot 277 to the rear end of a lever 278, on which lever is a pawl 279 engaging the teeth of a segmental rack 280; and the pawl is held in engagement by a spring 281, in the construction shown.

A wire straightener 282, consisting of rollers 283, arranged staggered, is located for the stay wires to pass between the rollers, and, as shown, a second wire straightener 284, consisting of rollers 285, arranged staggered, is located above the wire straightener 282, and is attached to a cross bar 286, or otherwise supported. These wire straighteners 282 and 284, insure the straightening of the stay wires before passing between the feed rollers or wheels, so that each stay wire will be forced upwardly, and will be perfectly straight, when passing between the feed rolls and cutters. Each stay wire 287 is straightened before being severed, and the stay section 288 severed from each stay wire, will be straight and will enter the receiving clamp therefor in a straight vertical plane, as shown in Fig. 10. The strand wires 289 pass up through the coilers in front of the fingers 199, and each strand wire is caught and held between the notches 247 and 248, when the notches are in a horizontal plane, so that, with the continuous revolution of the drum, the strand wires will be fed forward continuously, until the notched ends 249 of the arms 250 are moved, releasing the strand wires and the completed fabric, for winding the fabric continuously on the reel.

The operation will be understood from the foregoing description, but briefly is as follows: The stay wires pass from their coils through the straightening mechanisms 182 and 184, and each stay wire passes up between its feed wheels or rolls 31 and 33 and is continuously advanced by the continuous revolution of the feed wheels or rolls. Each stay wire passes upwardly between the cutter shafts 56 and 59, which shafts continuously revolve, carrying around the cutters or knives 60 and 61, for the cutters or knives to act as they pass each other, as shown in Fig. 10, and sever the leading end of each stay wire 287 into a stay section 288 of the required length to span the space between two adjoining strand wires; each severed stay section, as the stay wires are fed upward, enters between the jaws of its clamp, with the clamp in the position shown in Fig. 10, and the jaws of the clamp open; and, as the clamp is swung upwardly and passes the cam edge of the plate 98 the handle 96 will be forced outward by the spring 97, closing the movable jaw 94 of the clamp and holding the caught stay section in the notch 92, for the continued swing of the clamp, with the rearward rock of the shaft 72, and the axial oscillation of the gear 83 from the gear 87 to turn the caught stay section from a vertical to a horizontal position and deliver the stay section over the coiler heads 147, when the coiler heads are in their normal or lowermost position. The removing fingers 199, during this delivery of the stay sections, pass from their normal position, shown in Fig. 10, to their depressed position shown in Fig. 11, so as to overlie the ends of the stay sections and remove the stay sections from the clamps with the return movement of the clamps to their normal position. The coiler heads, as the stay sections are delivered thereover, while continuously revolving, begin their upward endwise reciprocating movement, and the overlapping ends of the stay sections, caught by the fingers 199, are engaged by the lips 149 of the coiler heads 147, and are coiled or wrapped around the adjacent longitudinal or strand wires, as the coiler heads move upwardly and continue to revolve, the fingers 199 moving upwardly with the coiler heads and being carried out of the line of travel of the stay and strand wires by the rock of the shaft 197, by which shaft the fingers are given a downward and upward throw; the clamps return to their normal or receiving position, so as to have entered between the jaws of each clamp the succeeding severed stay sections, and with the movement of the stay carriers from their normal position to their delivery position the coilers, which still continue to revolve, have completed their operation on the ends of the preceding stay sections and are returned to their normal or lowermost position, for the next operation of coiling the next stay sections at their ends around the longitudinal or strand wires.

The various mechanisms are so timed as to have a continuous operation, and at the same time the movements of the various mechanisms are such as to make the operation a continuous one from start to finish, in applying the stays to the longitudinal or strand wires. The completed fabric and the longitudinal or strand wires are continuously advanced by the continuous revolving of the drum over which the completed fabric and the longitudinal or strand wires pass; and the completed fabric is wound on a core or reel which is continuously revolved as the shaft 272 revolves continuously. The required tension for the feed wheels or rolls 31 and 33 is obtained by the springs 43 and the cams 44 for each spring; and the springs 43 also allow the feed wheels or rolls 33 to pass kinks or imperfections in the stay wires without injury to the stay wire infeeding mechanism; and it will be understood that the graduated feed wheels or rolls are used in the making of a wire fence fabric having the longitudinal or strand wires spaced apart, at graduated distances, but for making a wire fabric having the longitudinal or strand wires equally spaced apart the feed wheels or rolls 31 and 33 should be of the same diameter for the entire series. The cutters 60 and 61, with the converging shafts 56 and 59, are used in connection with the making of a wire fence or other wire fabric in which the longitudinal or strand wires are spaced apart at graduated distances, but for making a wire fence or wire fabric in which the longitudinal or strand wires are spaced an equal distance apart, the shafts 56 and 59 can run parallel, and the knives or cutters 60 and 61 can be of the same length. The clamping and removing fingers 199, as shown, each have their acting end cut away so as to form a notch for the passage of each finger over the longitudinal or strand wires, and so that the acting end of the finger will positively engage and clamp and hold down the ends of the stay sections so as to remove the stay sections from the carrier clamps by which the stay sections are delivered over the ends of the coilers. The gears 77, in effect, are each a segmental rack, and instead of having the rock shaft 72 pass through the gears, the gears could be in the form of a segmental rack resting on the rock shaft and fixedly supported by the bars 81, or in any suitable manner.

It will be understood that each gear 83 can be mounted on its journal 86, so as to revolve thereon, or each gear 83 could be fixedly mounted on its journal 86, and the journal stem 87 revolved in the rock shaft 72 by which the gear is carried and given its swinging movement.

It will be seen that the main driving shaft 15 is given a continuous revolution, and such revolution is transmitted to the shafts 20, 30, 57, 124, 230, 236, 242, 267 and 274, and that the shaft 59 and the coiler shafts also have a continuous revolution, with the result that the various mechanisms continuously operate, when the shaft 15 is revolved; and it is to be further understood that the continuous operations of the various mechanisms are so timed, and the movement of each so arranged, as to make the operation of the machine, in producing the fabric, a continuous one from the start to the finish.

Each finger 199, in the construction shown, has a short member or prong 199$^a$, and a long member or prong 199$^b$, with a groove 199$^c$ on the under side of the longer member or prong, so as to keep such member or prong from bearing on the stay wire section close thereto. The two members or prongs are separated from each other by a slot 199$^d$ which receives the strand wire, so that the short member or prong will engage the end of the stay section close to it, and the long member or prong will engage the end of the other stay section in operation.

What I claim as new and desire to secure by Letters Patent is:

1. In a wire fence machine, the combination of a pull out roll continuously drawing forward a plurality of strand wires, a plurality of stay feed wheels continuously feeding in stay wires transverse of the strand wires, a plurality of cutters arranged in pairs and continuously revolving for severing a plurality of stay sections, and a plurality of continuously rotating coilers for coiling the ends of the stay sections around the strand wires, substantially as described.

2. In a wire fence machine, the combination of a pull out roll continuously drawing forward a plurality of strand wires, a plurality of stay feed wheels continuously feeding in stay wires transverse of the strand wires, a plurality of cutters arranged in pairs and continuously revolving for severing a plurality of stay sections, a plurality of swinging stay section carriers for delivering the severed stay sections to coilers, and a plurality of continuously rotating coilers for coiling the ends of the stay sections around the strand wires, substantially as described.

3. In a wire fence machine, the combination of a plurality of cutters arranged in pairs and continuously revolving for severing a plurality of stay sections, a plurality of swinging stay section carriers for delivering the severed stay sections to coilers, and a plurality of continuously rotating coilers for coiling the ends of the stay sections around the strand wires, substantially as described.

4. In a wire fence machine, the combination of a plurality of coilers, and a plurality of swinging stay section carriers adapted to clamp stay sections and convey the severed sections bodily through the air and deliver them to the coilers in position for coiling, substantially as described.

5. In a wire fence machine, the combination of a plurality of coilers, and a plurality of swinging and oscillating stay section carriers adapted to clamp stay sections and convey the severed sections bodily through the air and deliver them to the coilers in position for coiling, substantially as described.

6. In a wire fence machine, the combination of a plurality of stay feed wheels arranged in pairs and continuously revolving for feeding in stay wires, and a plurality of cutters arranged in pairs and continuously revolving, for severing a plurality of stay sections from a plurality of stay wires, substantially as described.

7. In a wire fence machine, the combination of a plurality of stay feed wheels arranged in pairs and continuously revolving for feeding in stay wires, a plurality of cutters arranged in pairs and continuously revolving for severing a plurality of stay sections from a plurality of stay wires, and a plurality of stay section carriers for clamping stay sections and conveying the severed sections bodily through the air and delivering them to coilers in position for coiling, substantially as described.

8. In a wire fence machine, the combination of a plurality of cutters arranged in pairs and continuously revolving for severing a plurality of stay sections from a plurality of stay wires, swinging stay section carriers, means for giving the carriers a swinging movement, and a clamp for each carrier for clamping stay sections and carrying the severed sections bodily through the air and delivering them to coilers in position for coiling, substantially as described.

9. In a wire fence machine, the combination of a plurality of cutters arranged in pairs and continuously revolving for severing a plurality of stay sections from a plurality of stay wires, stay section carriers consisting of a plurality of swinging gears, means for giving the gears a swinging movement, and a clamp for each gear for clamping stay sections and carrying the severed sections bodily through the air and delivering them to coilers in position for coiling, substantially as described.

10. In a wire fence machine, stay section carriers consisting of a rock shaft, a plurality of gears entered onto the rock shaft and having a fixed relation, a plurality of gears meshing with the fixed gears and revolving with the rock shaft and having a combined swinging and oscillating movement, and a plurality of clamps carried by the swinging and oscillating gears for clamping stay sections and carrying the severed sections bodily through the air and delivering them to coilers in position for coiling, substantially as described.

11. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, and a plurality of clamps carried by the swinging and oscillating gears, for continuously advancing a plurality of stay wires, severing the stay wires into stay sections and delivering the severed stay sections in position for coiling the ends around the strand wires, substantially as described.

12. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear and entered into the rock shaft, a stem extending from each swinging and oscillating gear, a fixed jaw for each stem, a movable jaw mounted on each stem, and means for closing and opening each movable jaw, for continuously advancing a plurality of stay wires, severing the stay wires into stay sections and delivering the severed stay sections in position for coiling the ends around the strand wires, substantially as described.

13. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear and entered into the rock shaft, a stem extending from each swinging and oscillating gear, a fixed jaw for each stem, a movable jaw mounted on each stem, a handle on each movable jaw, a spring between the handle and stem for closing the jaw, and means for opening each jaw, for continuously advancing a plurality of stay wires, severing the stay wires into stay sections and delivering the severed stay sections in position for coiling the ends around the strand wires, substantially as described.

14. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear and entered into the rock shaft, a stem extending from each swinging and oscillating gear, a fixed jaw for each stem, a movable jaw mounted on each stem, a handle on each movable jaw, a spring between the handle and stem for closing the jaw, and a cam plate engaging the handle and opening each jaw, for continuously advancing a plurality of stay wires, severing the stay wires into stay sections and delivering the severed stay sections in position for coiling the ends around the strand wires, substantially as described.

15. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, and means for giving the shaft its rocking movement, for continuously advancing a plurality of stay wires, severing the stay wires into stay sections and delivering the severed stay sections in position for coiling the ends around the strand wires, substantially as described.

16. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, and means for actuating the levers, for continuously advancing a plurality of stay wires, severing the stay wires into stay sections and delivering the severed stay sections in position for coiling the ends around the strand wires, substantially as described.

17. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, a connecting rod for each lever, and means for simultaneously reciprocating each connecting rod for continuously advancing a plurality of stay wires, severing the stay wires into stay sections and delivering the severed stay sections in position for coiling the ends around the strand wires, substantially as described.

18. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, a connecting rod for each lever, an upper roller on each connecting rod, a lower roller on each connecting rod, a cam between the upper and lower rollers, and a continuously revolving shaft carrying the cams for continuously advancing a plurality of stay wires, severing the stay wires into stay sections and delivering the severed stay sections in position for coiling the ends around the strand wires, substantially as described.

19. In a wire fence machine, the combination of a plurality of feed wheels arranged in pairs and continuously revolving, a plurality of cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, a connecting rod for each lever, an upper roller on each connecting rod, a lower roller on each connecting rod, a cam between the upper and lower rollers, a continuously revolving shaft carrying the cams, and means for continuously revolving the shaft carrying the cams, for continuously advancing a plurality of stay wires, severing the stay wires into stay sections and delivering the severed stay sections in position for coiling the ends around the strand wires, substantially as described.

20. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, and a plurality of clamps carried by the swinging and oscillating gears, for continuously advancing a plurality of stay wires, severing the stay wires into stay sections and delivering the severed stay sections in position for coiling the ends around the strand wires, substantially as described.

21. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear and entered into the rock shaft, a stem extending from each swinging and axially oscillating gear, a fixed jaw for each stem, a movable jaw mounted on each stem, and means for closing and opening each movable jaw, for continuously advancing a plurality of stay wires, severing the stay wires into stay sections and delivering the severed stay sections in position for coiling the ends around the strand wires, substantially as described.

22. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear and entered into the rock shaft, a stem extending from each swinging and oscillating gear, a fixed jaw for each stem, a movable jaw mounted on each stem, a handle on each movable jaw, a spring between the handle and stem for closing the jaw, and means for opening each jaw, for continuously advancing a plurality of stay wires, severing the stay wires into stay sections and delivering the severed stay sections in position for coiling the ends around the strand wires, substantially as described.

23. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear and entered into the rock shaft, a stem extending from each swinging and oscillating gear, a fixed jaw for each stem, a movable jaw mounted on each stem, a handle on each movable jaw, a spring between the handle and stem for closing the jaw, and a cam plate engaging the handle and opening each jaw, for continuously advancing a plurality of stay wires, severing the stay wires into stay sections and delivering the severed stay sections in position for coiling the ends around the strand wires, substantially as described.

24. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, and means for giving the shaft its rocking movement, for continuously advancing a plurality of stay wires, severing the stay wires into stay sections and delivering the severed stay sections in position for coiling the ends around the strand wires, substantially as described.

25. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, and means for actuating the lever for continuously advancing a plurality of stay wires, severing the stay wires into stay sections and delivering the severed stay sections in position for coiling the ends around the strand wires, substantially as described.

26. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, a connecting rod for each lever, and means for simultaneously reciprocating each connecting rod, for continuously advancing a plurality of stay wires, severing the stay wires into stay sections and delivering the severed stay sections in position for coiling the ends around the strand wires, substantially as described.

27. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, a connecting rod for each lever, an upper roller on each connecting rod, a lower roller on each connecting rod, a cam between the upper and lower rollers, and a continuously revolving shaft carrying the cams, for continuously advancing a plurality of stay wires, severing the stay wires into stay sections and delivering the severed stay sections in position for coiling the ends around the strand wires, substantially as described.

28. In a wire fence machine, the combination of a plurality of graduated feed wheels arranged in pairs and continuously revolving, a plurality of graduated cutters arranged in pairs and continuously revolving, a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, a pair of pinions on the rock shaft, a rack bar for each pinion, a lever for each rack bar, a connecting rod for each lever, an upper roller on each connecting rod, a lower roller on each connecting rod, a cam between the upper and lower rollers, and a continuously revolving shaft carrying the cams, and means for continuously revolving the cam shaft, for continuously advancing a plurality of stay wires, severing the stay wires into stay sections and delivering the severed stay sections in position for coiling the ends around the strand wires, substantially as described.

29. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, and a clamp carried by the swinging and oscillating gear, for continuously advancing a stay wire, severing the leading end of the stay wire into a stay section and delivering the severed stay section in position for coiling the ends around strand wires, substantially as described.

30. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a journal pin for the swinging and oscillating gear, a stem extending from the swinging and oscillating gear, a fixed jaw for the stem, a movable jaw mounted on the stem, and means for closing and opening each movable jaw, for continuously advancing a stay wire, severing the leading end of the stay wire into a stay section and delivering the severed stay section in position for coiling the ends around strand wires, substantially as described.

31. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a journal pin for the swinging and oscillating gear, a stem extending from the swinging and oscillating gear, a fixed jaw for the stem, a movable jaw mounted on the stem, a handle on the movable jaw, a spring between the handle and the stem for closing the movable jaw, and means for opening the movable jaw, for continuously advancing a stay wire, severing the leading end of the stay wire into a stay section and delivering the severed stay section in position for coiling the ends around strand wires, substantially as described.

32. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a journal pin for the swinging and oscillating gear, a stem extending from the swinging and oscillating gear, a fixed jaw for the stem, a movable jaw mounted on the stem, a handle on the movable jaw, a spring between the handle and the stem for closing the movable jaw, and a cam plate engaging the handle and opening the movable jaw, for continuously advancing a stay wire, severing the leading end of the stay wire into a stay section and delivering the severed stay section in position for coiling the ends around strand wires, substantially as described.

33. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a clamp carried by the swinging and oscillating gear, and means for giving the shaft a rocking movement, for continuously advancing a stay wire, severing the leading end of the stay wire into a stay section and delivering the severed stay section in position for coiling the ends around strand wires, substantially as described.

34. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a clamp carried by the swinging and oscillating gear, a pinion on the rock shaft, a rack bar, engaging the pinion, and means for reciprocating the rack bar, for continuously advancing a stay wire, severing the leading end of the stay wire into a stay section and delivering the severed stay section in position for coiling the ends around strand wires, substantially as described.

35. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a clamp carried by the swinging and oscillating gear, a pinion on the rock shaft, a rack bar engaging the pinion, a swinging lever for the rack bar, a connecting rod for the lever, and means for oscillating the connecting rod, for continuously advancing a stay wire, severing the leading end of the stay wire into a stay section and delivering the severed stay section in position for coiling the ends around strand wires, substantially as described.

36. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gears and connected with the rock shaft and having a combined swinging and oscillating movement, a clamp carried by the swinging and oscillating gear, a pinion on the rock shaft, a rack bar engaging the pinion, a swinging lever for the rack bar, a connecting rod for the lever, an upper roller on the connecting rod, a lower roller on the connecting rod, and means for engaging the rollers and giving the connecting rod a reciprocating movement, for continuously advancing a stay wire, severing the leading end of the stay wire into a stay section and delivering the severed stay section in position for coiling the ends around strand wires, substantially as described.

37. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a clamp carried by the swinging and oscillating gear, a pinion on the rock shaft, a rack bar engaging the pinion, a swinging lever for the rack bar, a connecting rod for the lever, an upper roller on the connecting rod, a lower roller on the connecting rod, a cam located between and engaging the two rollers, and a continuously revolving shaft carrying the cam, for continuously advancing a stay wire, severing the leading end of the stay wire into a stay section and delivering the severed stay section in position for coiling the ends around strand wires, substantially as described.

38. In a wire fence machine, the combination of a pair of feed wheels continuously revolving, a pair of cutters continuously revolving, a rock shaft, a pair of gears, one gear non-revoluble and having a fixed relation on the rock shaft, and the other gear meshing with the fixed gear and connected with the rock shaft and having a combined swinging and oscillating movement, a clamp carried by the swinging and oscillating gear, a pinion on the rock shaft, a rack bar engaging the pinion, a swinging lever for the rack bar, a connecting rod for the lever, an upper roller on the connecting rod, a lower roller on the connecting rod, a cam located between and engaging the two rollers, a continuously revolving shaft carrying the cam, and means for continuously revolving the shaft of the cam, for continuously advancing a stay wire, severing the leading end of the stay wire into a stay section and delivering the severed stay section in position for coiling the ends around strand wires, substantially as described.

39. In a wire fence machine, the combination of a plurality of cutters arranged in pairs and continuously revolving, for severing a plurality of stay sections from a plurality of stay wires, and a stay section carrier consisting of a plurality of swinging and oscillating gears, means for giving the gears a swinging and oscillating movement, and a clamp for each gear, each clamp receiving and delivering a stay section in position for coiling the ends of the stay sections around strand wires, substantially as described.

40. In a wire fence machine, the combination of a plurality of cutters arranged in pairs and continuously revolving, for severing a plurality of stay sections from a plurality of stay wires, and a stay section carrier consisting of a plurality of swinging and oscillating gears, means for giving the gears a swinging and oscillating movement, a journal pin for each swinging and oscillating gear, a stem extending from each swinging and axially oscillating gear, a fixed jaw for each stem, a movable jaw mounted on each stem, and means for closing and opening each movable jaw, the jaws receiving and delivering the stay sections in position for coiling the ends around strand wires, substantially as described.

41. In a wire fence machine, the combination of a plurality of cutters arranged in pairs and continuously revolving, for severing a plurality of stay sections from a plurality of stay wires, and a stay section carrier consisting of a plurality of swinging and oscillating gears, means for giving the gears a swinging and oscillating movement, a journal pin for each swinging and oscillating gear, a stem extending from each swinging and oscillating gear, a fixed jaw for each stem, a movable jaw mounted on each stem, a handle for each movable jaw, a spring between each handle and stem for closing the movable jaw, and means for opening each movable jaw, the jaws receiving and delivering the stay sections in position for coiling the ends around strand wires, substantially as described.

42. In a wire fence machine, the combination of a plurality of cutters arranged in pairs and continuously revolving, for severing a plurality of stay sections from a plurality of stay wires, and a stay section carrier consisting of a plurality of swinging and oscillating gears, means for giving the gears a swinging and oscillating movement, a journal pin for each swinging and oscillating gear, a stem extending from each swinging and oscillating gear, a fixed jaw for each stem, a movable jaw mounted on each stem, a handle for each movable jaw, a spring between each handle and stem for closing the movable jaw, and a cam plate engaging each handle and opening the movable jaw, the jaws receiving and delivering the stay sections in position for coiling the ends around strand wires, substantially as described.

43. In a wire fence machine, a stay section carrier consisting of a rock shaft, a plurality of gears entered onto the rock shaft and having a fixed relation, a plurality of gears meshing with the fixed gears and connected with the rock shaft and having a combined swinging and oscillating movement, and a plurality of clamps carried by the swinging and oscillating gears, for receiving and delivering stay sections in position for coiling the ends around strand wires, substantially as described.

44. In a wire fence machine, a stay section carrier consisting of a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear, a stem extending from each swinging and oscillating gear, a fixed jaw for the stem, a movable jaw mounted on the stem, and means for closing and opening each movable jaw, for receiving and delivering stay sections in position for coiling the ends around strand wires, substantially as described.

45. In a wire fence machine, a stay section carrier consisting of a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear, a stem extending from each swinging and oscillating gear, a fixed jaw for the stem, a movable jaw mounted on the stem, a handle on the movable jaw, a spring between the handle and the stem for closing the movable jaw, and means for opening the movable jaw, for receiving and delivering the stay sections in position for coiling the ends around strand wires, substantially as described.

46. In a wire fence machine, a stay section carrier consisting of a rock shaft, a plurality of gears entered onto the rock shaft and having a fixed relation, a plurality of gears meshing with the fixed gears and connected with the rock shaft and having a combined swinging and oscillating movement, a journal pin for each swinging and oscillating gear, a stem extending from each swinging and oscillating gear, a fixed jaw for the stem, a movable jaw mounted on the stem, a handle on the movable jaw, a spring between the handle and the stem for closing the movable jaw, and a cam plate engaging the handle and opening the movable jaw, for receiving and delivering the stay sections in position for coiling the ends around strand wires, substantially as described.

47. In a wire fence machine, the combination of a stay section carrier consisting of a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, for receiving and delivering stay sections in position for coiling the ends around strand wires, and means for rocking the shaft, substantially as described.

48. In a wire fence machine, the combination of a stay section carrier consisting of a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, for receiving and delivering stay sections in position for coiling the ends around strand wires, a pinion fixedly mounted on the rock shaft at each end, a rack bar for each pinion, a swinging lever for each rack bar, and means for swinging the lever to reciprocate each rack bar, substantially as described.

49. In a wire fence machine, the combination of a stay section carrier consisting of a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, for receiving and delivering stay sections in position for coiling the ends around strand wires, a pinion fixedly mounted on the rock shaft at each end, a rack bar for each pinion, a swinging lever for each rack bar, a connecting rod for each lever, an upper roller on each connecting rod, a lower roller on each connecting rod, and means engaging the rollers and reciprocating the connecting rod for swinging the levers and reciprocating the rack bars, substantially as described.

50. In a wire fence machine, the combination of a stay section carrier consisting of a rock shaft, a plurality of gears entered onto the rock shaft and having a fixed relation, a plurality of gears meshing with the fixed gears and connected with the rock shaft and having a combined swinging and oscillating movement, a plurality of clamps carried by the swinging and oscillating gears, for receiving and delivering stay sections in position for coiling the ends around strand wires, a pinion fixedly mounted on the rock shaft at each end, a rack bar for each pinion, a swinging lever for each rack bar, a connecting rod for each lever, an upper roller on each connecting rod, a lower roller on each connecting rod, a cam between the upper and lower rollers, and a continuously revolving shaft carrying the cams for reciprocating the rack bars, substantially as described.

51. In a wire fence machine, the combination of a stay section carrier consisting of a rock-shaft, a plurality of gears entered onto the rock-shaft and having a fixed relation, a plurality of gears meshing with the fixed gears and connected with the rock-shaft and having a combined swinging and oscillating movement, a plurality of clamps carried by the swinging and oscillating gears, for receiving and delivering stay sections in position for coiling the ends around strand wires, a pinion fixedly mounted on the rock-shaft at each end, a rack-bar for each pinion, a swinging lever for each rack-bar, a connecting rod for each lever, an upper roller on each connecting rod, a lower roller on each connecting rod, a cam between the upper and lower rollers, a continuously revolving shaft carrying the cams, and means for continuously revolving the cam shaft, for reciprocating the rack-bars, substantially as described.

52. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swinging and oscillating movement for each gear, and a clamp for each swinging and oscillating gear, each clamp receiving and delivering a severed stay section, substantially as described.

53. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swinging and oscillating movement for each gear, a journal pin for each swinging and oscillating gear and entered into the rock shaft, a stem extending from each swinging and oscillating gear, a fixed jaw for each stem, a movable jaw mounted on each stem, and means for closing and opening each movable jaw, substantially as described.

54. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swinging and oscillating movement for each gear, a journal pin for each swinging and oscillating gear and entered into the rock shaft, a stem extending from each swinging and oscillating gear, a fixed jaw for each stem, a movable jaw mounted on each stem, a handle on each movable jaw, a spring between the handle and stem for closing each movable jaw, and means for opening each movable jaw, substantially as described.

55. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swing and oscillating movement for each gear, a journal pin for each swinging and oscillating gear and entered into the rock shaft, a stem extending from each swinging and oscillating gear, a fixed jaw for each stem, a movable jaw mounted on each stem, a handle on each movable jaw, a spring between the handle and stem for closing each movable jaw, and a cam plate engaging the handle of each movable jaw and opening the jaw, substantially as described.

56. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swinging and oscillating movement for each gear, a journal pin for each swinging and oscillating gear and entered onto the rock shaft, a stem extending from each swinging and oscillating gear, a fixed jaw for each stem, a movable jaw mounted on each stem, means for closing and opening each movable jaw, and means for rocking the shaft, substantially as described.

57. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swinging and oscillating movement for each gear, a journal pin for each swinging and oscillating gear and entered onto the rock shaft, a stem extending from each swinging and oscillating gear, a fixed jaw for each stem, a movable jaw mounted on each stem, means for closing and opening each movable jaw, a pinion on the rock shaft, a rack engaging the pinion, a swinging lever for the rack, and means for giving the swinging lever its movement to reciprocate the rack-bar, substantially as described.

58. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swinging and oscillating movement for each gear, a journal pin for each swinging and oscillating gear and entered onto the rock shaft, a stem extending from each swinging and oscillating gear, a fixed jaw for each stem, a movable jaw mounted on each stem, means for closing and opening each movable jaw, a pinion on the rock shaft, a rack engaging the pinion, a swinging lever for the rack, a connecting rod for the lever, an upper roller on the connecting rod, a lower roller on the connecting rod, and means engaging the upper and lower rollers to reciprocate the connecting rod and operate the lever to reciprocate the rack bar, substantially as described.

59. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock shaft, a series of gears entered onto the rock shaft and having a fixed relation, a series of gears connected with the rock shaft and meshing with the series of fixed gears, and having a combined swinging and oscillating movement for each gear, a journal pin for each swinging and oscillating gear and entered onto the rock shaft, a stem extending from each swinging and oscillating gear, a fixed jaw for each stem, a movable jaw mounted on each stem, means for closing and opening each movable jaw, a pinion on the rock shaft, a rack engaging the pinion, a swinging lever for the rack, a connecting rod for the lever, an upper roller on the connecting rod, a lower roller on the connecting rod, a cam between the upper and lower rollers, a continuously revolving shaft carrying the cam for reciprocating the rack bar, substantially as described.

60. In a wire fence machine, the combination of a continuously revolving shaft, a series of graduated feed wheels on the shaft, a series of companion graduated feed wheels, a yieldable frame supporting each companion graduated feed wheel for continuously feeding forward a plurality of stay wires, a pair of continuously revolving converging shafts, a series of graduated cutters on each shaft, both series of cutters continuously revolving for severing the leading ends of stay wires into stay sections while the stay wires are continuously advancing, and a stay carrier receiving the severed stay sections and delivering the same in position for coiling the ends around strand wires, said stay carrier consisting of a rock-shaft, a series of gears entered onto the rock-shaft and having a fixed relation, a series of gears connected with the rock-shaft and meshing with the series of fixed gears, and having a combined swinging and oscillating movement for each gear, a journal-pin for each swinging and oscillating gear and entered onto the rock-shaft, a stem extending from each swinging and oscillating gear, a fixed jaw for each stem, a movable jaw mounted on each stem, means for closing and opening each movable jaw, a pinion on the rock-shaft, a rack engaging the pinion, a swinging lever for the rack, a connecting rod for the lever, an upper roller on the connecting rod, a lower roller on the connecting rod, a cam between the upper and lower rollers, a continuously revolving shaft carrying the cam, and means for continuously revolving the cam shaft, substantially as described.

61. In a wire fence machine, a stay section carrier consisting of a rock-shaft, a plurality of non-revoluble gears entered onto the rock shaft and having a fixed relation, a plurality of gears meshing with the fixed gears and connected with the rock-shaft and having a combined swinging and oscillating movement, a plurality of clamps carried by the swinging and oscillating gears and arranged with some clamps longer than others, for receiving and delivering the stay sections in position on opposite sides of strand wires for coiling the stay section ends around the strand wires, substantially as described.

62. In a wire fence machine, a stay section carrier consisting of a rock-shaft, a plurality of non-revoluble gears entered onto the rock-shaft and having a fixed relation, a plurality of gears meshing with the fixed gears and connected with the rock-shaft and having a combined swinging and oscillating movement, a journal-pin for each swinging and oscillating gear, a stem extending from each swinging and oscillating gear with some stems longer than others, a fixed jaw for each stem, a movable jaw mounted on each stem, and means for closing and opening each movable jaw, for receiving and delivering stay sections on opposite sides of strand wires for coiling the stay section ends around the strand wires, substantially as described.

63. In a wire fence machine, a stay section carrier consisting of a rock shaft, a plurality of non-revoluble gears entered onto the rock shaft and having a fixed relation, a plurality of gears meshing with the fixed gears and connected with the rock shaft and having a combined swinging and oscillating movement, a journal pin for each swinging and oscillating gear, a stem extending from each swinging and oscillating gear with some stems longer than others, a fixed jaw for each stem, a movable jaw mounted on each stem, a handle on the movable jaw, a spring between the handle and stem for closing the movable jaw, and means for opening the movable jaw, for receiving and delivering stay sections on opposite sides of strand wires for coiling the stay section ends around the strand wires, substantially as described.

64. In a wire fence machine, a stay section carrier consisting of a rock shaft, a plurality of non-revoluble gears entered onto the rock shaft and having a fixed relation, a plurality of gears meshing with the fixed gears and connected with the rock shaft and having a combined swinging and oscillating movement, a journal pin for each swinging and oscillating gear, a stem extending from each swinging and oscillating gear with alternate stems of greater length than intermediate stems, a fixed jaw for each stem, a movable jaw mounted on each stem, a handle on the movable jaw, a spring between the handle and stem for closing the movable jaw, and a cam plate engaging the handle and opening the movable jaw, for receiving and delivering stay sections on opposite sides of strand wires for coiling the stay section ends around the strand wires, substantially as described.

65. In a wire fence machine, a stay section carrier consisting of a rock shaft, a plurality of non-revoluble gears entered onto the rock shaft and having a fixed relation, a plurality of gears meshing with the fixed gears and connected with the rock shaft and having a combined swinging and oscillating movement, a plurality of clamps carried by the swinging and oscillating gears and arranged with some clamps longer than others for receiving and delivering the stay sections in position on opposite sides of strand wires for coiling the stay section ends around the strand wires, and means for giving the rock shaft its movement, substantially as described.

66. In a wire fence machine, the combination of a stay section carrier receiving and delivering a plurality of stay sections in position for coiling the ends of the stay sections around strand wires, a plurality of continuously revolving and endwise reciprocable coilers, a cross head having a vertically rising and falling movement for giving the plurality of coilers their reciprocating movement; means for giving the cross-head its rising and falling movement, a rock-shaft carried by the cross-head, a plurality of fingers on the rock-shaft, one finger for each strand wire, and means for giving the rock-shafts its movement, substantially as described.

67. In a wire fence machine, the combination of a stay section carrier receiving and delivering a plurality of stay sections in position for coiling the ends of the stay sections around strand wires, a plurality of continuously revolving and endwise reciprocable coilers, a cross-head having a vertically rising and falling movement for giving the plurality of coilers their reciprocating movement, a walking-beam lever connected at one end with the cross-head, a reciprocating rod connected with the other end of the walking-beam lever, an upper roller on the reciprocating rod, a lower roller on the reciprocating rod, a cam between the two rollers of the reciprocating rod, a continuously revolving shaft carrying the cam, a rock-shaft carried by the cross-head, a plurality of fingers on the rock-shaft, one finger for each strand wire, and means for giving the rock-shaft its movement, substantially as described.

68. In a wire fence machine, the combination of a stay section carrier receiving and delivering a plurality of stay sections in position for coiling the ends of the stay sections around strand wires, a plurality of continuously revolving and endwise reciprocable coilers, a cross head having a vertically rising and falling movement for giving the plurality of coilers their reciprocating movement, a walking beam lever connected at one end with the cross-head, a reciprocating rod connecting with the other end of the walking-beam lever, an upper roller on the reciprocating rod, a lower roller on the reciprocating rod, a cam between the two rollers of the reciprocating rod, a continuously revolving shaft carrying the cam, a rock-shaft carried by the cross-head, a plurality of fingers on the rock-shaft, one finger for each strand wire, a pinion on the rock-shaft, a reciprocating rack engaging the pinion, a swinging link for operating the rack, a lever connected with the swinging link, a reciprocating rod connected with the lever, a roller on the reciprocating rod, and a cam on the continuously revolving shaft engaging the roller and operating the reciprocating rod, substantially as described.

69. In a wire fence machine, the combination of a plurality of feed wheels arranged in pairs and continuously revolving, a plurality of cutters arranged in pairs and continuously revolving, a rock-shaft, a plurality of non-revoluble gears entered onto the rock-shaft and having a fixed relation, a plurality of gears meshing with the fixed gears and connected with the rock-shaft and having a combined swinging and oscillating movement, a clamp for each swinging and oscillating gear, each clamp receiving and delivering a severed stay section in position over the coiler heads, a plurality of coilers through which the strand wires pass, each coiler having a continuous revolution and an endwise reciprocating movement, and a plurality of fingers having a rising and falling movement and a rocking movement, substantially as described.

70. In a wire fence machine, the combination of a plurality of feed wheels arranged in pairs and continuously revolving, a plurality of cutters arranged in pairs and continuously revolving, a rock-shaft, a plurality of non-revoluble gears entered onto the rock-shaft and having a fixed relation, a plurality of gears meshing with the fixed gears and connected with the rock-shaft and having a combined swinging and oscillating movement, a clamp for each swinging and oscillating gear, each clamp having a fixed jaw and a movable jaw, and each clamp receiving and delivering a severed stay section in position over the coiler heads, a plurality of coilers through which the strand wires pass, each coiler having a continuous revolution and an endwise reciprocating movement, and a plurality of fingers having a rising and falling movement and a rocking movement, substantially as described.

71. In a wire fence machine, the combination of means for continuously advancing a plurality of stay wires, means for cutting off the leading end of each stay wire to form a stay section for spanning the space between two adjacent strand wires, a carrier for the severed stay sections, said carrier comprising a plurality of clamps, each clamp having a swinging movement, and a plurality of coilers, each coiler having a longitudinal hole for the passage of a strand wire and having a head over which the stay wire sections are delivered by the clamps of the stay section carrier for coiling the ends of the stay sections around the strand wires, substantially as described.

72. In a wire fence machine, the combination of means for continuously advancing a plurality of stay wires, means for cutting off the leading end of each stay wire to form a stay section for spanning the space between two adjacent strand wires, a carrier for the severed stay sections, said carrier comprising a plurality of clamps, each clamp having a swinging movement, a plurality of coilers each coiler having a longitudinal hole for the passage of a strand wire and having a head over which the stay sections are delivered by the clamps of the stay section carrier, and means for engaging the stay sections for coiling the ends of the stay sections around the strand wires, substantially as described.

73. In a wire fence machine, the combination of means for continuously advancing a plurality of stay wires, means for cutting off the leading end of each stay wire to form a stay section for spanning the space between two adjacent strand wires, a carrier for the severed stay sections, said carrier comprising a plurality of clamps, each clamp having a swinging movement, a plurality of coilers, each coiler having a longitudinal hole for the passage of a strand wire and having a head over which the stay sections are delivered by the clamps of the stay section carrier, and a plurality of fingers for engaging the stay sections for coiling the ends of the stay sections around the strand wires, substantially as described.

74. In a wire fence machine, the combination of means for continuously advancing a plurality of stay wires, means for cutting off the leading end of each stay wire to form a stay section for spanning the space between two adjacent strand wires, a carrier for the severed stay sections, said carrier comprising a plurality of clamps, each clamp having a swinging movement, and a plurality of coilers, each coiler continuously revolving and having an endwise reciprocating movement and each coiler having a longitudinal hole for the passage of a strand wire and having a head over which the stay sections are delivered by the clamps of the stay section carrier, for coiling the ends of the stay sections around the strand wires, substantially as described.

75. In a wire fence machine, the combination of means for continuously advancing a plurality of stay wires, means for cutting off the leading end of each stay wire to form a stay section for spanning the space between two adjacent strand wires, a carrier for the severed stay sections, said carrier comprising a plurality of clamps, each clamp having a swinging movement, a plurality of coilers, each coiler continuously revolving and having an endwise reciprocating movement, and each coiler having a longitudinal hole for the passage of a strand wire and having a head over which the stay sections are delivered by the clamps of the stay-section carrier, means for continuously revolving the coilers, and means for giving the coilers an endwise reciprocating movement, for coiling the ends of the stay sections around the strand wires, substantially as described.

JOSEPH M. DENNING.

Witnesses:
 HARVEY J. HULES,
 JOE HYNES.